United States Patent
Stokes et al.

(10) Patent No.: US 12,493,023 B2
(45) Date of Patent: Dec. 9, 2025

(54) CRYSTALLITE SIZE IN ROCK SAMPLES

(71) Applicant: Chevron U.S.A. Inc., San Ramon, CA (US)

(72) Inventors: Rebecca Stokes, San Ramon, CA (US); Paul Montgomery, Bricklehampton (GB); Andrew P. Rathbun, San Ramon, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 85 days.

(21) Appl. No.: 18/003,469

(22) PCT Filed: Jul. 1, 2020

(86) PCT No.: PCT/US2020/040552
§ 371 (c)(1),
(2) Date: Dec. 27, 2022

(87) PCT Pub. No.: WO2022/005477
PCT Pub. Date: Jan. 6, 2022

(65) Prior Publication Data
US 2023/0333078 A1    Oct. 19, 2023

(51) Int. Cl.
*G01N 33/24* (2006.01)
*G01N 23/2055* (2018.01)

(52) U.S. Cl.
CPC ......... *G01N 33/24* (2013.01); *G01N 23/2055* (2013.01); *G01N 2223/616* (2013.01)

(58) Field of Classification Search
CPC .... G01N 33/24; G01N 33/2055; G01N 33/20; G01N 2223/616
See application file for complete search history.

(56) References Cited

U.S. PATENT DOCUMENTS

| | | |
|---|---|---|
| 7,126,340 B1 | 10/2006 | Ameen |
| 8,909,508 B2 | 12/2014 | Hurley |
| 9,528,874 B2 | 12/2016 | Larter |
| 10,515,715 B1 | 12/2019 | Pappas |
| 10,705,019 B2 * | 7/2020 | Humfeld ............ G01N 21/6408 |
| 10,927,671 B1 | 2/2021 | Tonner |
| 11,262,302 B2 * | 3/2022 | Humfeld ............... G01J 3/4406 |
| 11,860,093 B2 * | 1/2024 | Humfeld ............ G01N 21/6408 |
| 2003/0154044 A1 | 8/2003 | Lundstedt |

(Continued)

FOREIGN PATENT DOCUMENTS

| | | |
|---|---|---|
| CN | 104181603 A | 12/2014 |
| CN | 106124602 B | 9/2017 |

(Continued)

OTHER PUBLICATIONS

Khamis et al. "Thermoluminescence Characteristics of Natural Quartz and Synthesized Silica Glass Prepared by Sol-Gel Technique", AJOPACS, 3(1): 1-16, 2017; Article No. AJOPACS.35542.*

(Continued)

*Primary Examiner* — Casey Bryant
(74) *Attorney, Agent, or Firm* — Marie L. Clapp

(57) ABSTRACT

A method comprises identifying a depositional form of a mineral phase in a sedimentary rock sample based on a measurement of a parameter indicative of a size of crystallites of the mineral phase in the rock sample.

8 Claims, 10 Drawing Sheets

(56) References Cited

U.S. PATENT DOCUMENTS

| | | |
|---|---|---|
| 2008/0059140 A1 | 3/2008 | Salmon |
| 2009/0084604 A1 | 4/2009 | Polizzotti |
| 2009/0103677 A1 | 4/2009 | Wood |
| 2009/0178439 A1 | 7/2009 | Bauer |
| 2010/0326669 A1 | 12/2010 | Zhu |
| 2012/0226653 A1 | 9/2012 | McLaughlin |
| 2013/0046469 A1 | 2/2013 | Herron |
| 2013/0144561 A1 | 6/2013 | Harb |
| 2013/0179080 A1 | 7/2013 | Skalinski |
| 2013/0182819 A1 | 7/2013 | Dvorkin |
| 2013/0270011 A1 | 10/2013 | Akkurt |
| 2014/0088876 A1 | 3/2014 | Shiley |
| 2014/0100833 A1 | 4/2014 | Williams |
| 2014/0376685 A1 | 12/2014 | Koroteev |
| 2015/0104078 A1 | 4/2015 | Varslot |
| 2015/0235376 A1 | 8/2015 | Derzhi |
| 2015/0310140 A1 | 10/2015 | Hoda |
| 2016/0018556 A1 | 1/2016 | Montgomery |
| 2016/0139293 A1 | 5/2016 | Misra |
| 2016/0349174 A1 | 12/2016 | Washburn |
| 2017/0067337 A1 | 3/2017 | Havens |
| 2017/0235016 A1 | 8/2017 | Prioul |
| 2017/0248011 A1 | 8/2017 | Craddock |
| 2018/0031732 A1 | 2/2018 | Mosse |
| 2018/0321416 A1 | 11/2018 | Freedman |
| 2018/0347354 A1 | 12/2018 | Li |
| 2018/0364381 A1 | 12/2018 | Raterman |
| 2019/0072534 A1 | 3/2019 | Simon |
| 2019/0143454 A1* | 5/2019 | Choi ............ B23K 26/042 264/1.37 |
| 2019/0285560 A1 | 9/2019 | Lenz |
| 2019/0339248 A1 | 11/2019 | Chen |
| 2020/0408090 A1 | 12/2020 | Kadayam Viswanathan |
| 2021/0349070 A1 | 11/2021 | Gettemy |

FOREIGN PATENT DOCUMENTS

| | | |
|---|---|---|
| CN | 111189830 B | 8/2022 |
| WO | 2015070022 W | 5/2015 |
| WO | 2019204555 A1 | 10/2019 |

OTHER PUBLICATIONS

M. E. Awad et al., "Crystallite size as a function of kaolinite structural order-disorder and kaolin chemical variability: Sedimentological implication", Applied Clay Science 162 (2018) pp. 261-267. (Year: 2018).*

Luca Aldega et al., "Detrital Illite Crystals Identified from Crystallite Thickness Measurements in Siliciclastic Sediments," American Mineralogist, 2005, vol. 90, pp. 1587-1596.

PCT International Search Report and Written Opinion, mailed on Sep. 28, 2020, issued in International Application No. PCT/US2020/040552, filed on Jul. 1, 2020, 11 pages.

Boyle et al. (Rapid elemental analysis of sediment samples by isotope source XRF, 2000) (Year: 2000).

Dong et al. e (Quartz types and origins in the paleozoic Wufeng-Longmaxi Formations, Eastern Sichuan Basin, China: Implications for porosity preservation in shale reservoirs, 2019) (Year: 2019).

El Gezeery T et al: "Innovative Geosteering Technology Utilized in Drilling Smart Multi-lateral Wells, Kuwait", Offshore Technology Conference, Mar. 28, 2025 (Mar. 28, 2025), XP093264783.

Jonathan Rocheleau et al., "Source Rock Characterization of the Carboniferous Golata Formation and Devonia Besa River Formation Outcrops, Liard Basin, Northwest Territories," Datapages/Search and Discovery Article #90224 GeoConvention, 2014, Focus—Adapt, Refine, Sustain Calgary, Alberta, canada, May 12-16, 2014.

Kylander et al., "High-resolution X-ray fluorescence core scanning analysis of Les Echets (France) sedimentary sequence: new insights from chemical proxies," 2010.

Lisha Wang et al., "The Burial of Biogenic Silica, Organic Carbon and Organic Nitrogen in the Sediments of the East China Sea," J. Ocean Univ. China (Oceanic and Coastal Sea Research) 2015, vol. 14, No. 3, pp. 464-470, Springer.

Li Chunxiao et al: "Multi-scale evaluation of mechanical properties of the Bakken shale", Journal of Material Science, Kluwer Academic Publishers, Dordrecht, vol. 54, No. 3, Sep. 25, 2018 (Sep. 25, 2018), pp. 2133-2151, XP036636627, ISSN: 0022-2461, DOI: 10.1007/S10853-018-2946-4 [retrieved on Sep. 25, 2018].

Mohsen Abdul et al: "Horizontal Well Correlation Using Real Time Data and Log Prediction in Geosteering Complex Reservoirs of Saudi Arabia", Mar. 13, 2013 (Mar. 13, 2013), XP093247978.

Ou Chenghua et al.; "Fine reservoir structure modeling based upon 3D visualized stratigraphic correlation between horizontal wells: methodology and its application," Journal of Geophysics and Engineering, vol. 14, No. 6, Nov. 22, 2017, pp. 1557-1571.

PCT International Search Report and Written Opinion, mailed on Dec. 9, 2020, issued in International Application No. PCT/US2020/040548, filed on Jul. 1, 2020, 123pages.

PCT International Search Report and Written Opinion, mailed on Mar. 10, 2021, issued in International Application No. PCT/US2020/040533, filed on Jul. 1, 2020, 13 pages.

PCT International Search Report and Written Opinion, mailed on Oct. 21, 2020, issued in International Application No. PCT/US2020/040539, filed on Jul. 1, 2020, 13 pages.

PCT International Search Report and Written Opinion, mailed on Sep. 30, 2020, issued in International Application No. PCT/US2020/040536, filed on Jul. 1, 2020, 12 pages.

Ramer et al., Attenuated Total Reflection Fourier Transform Infrared Spectroscopy, Mar. 15, 2013, Infrared Spectroscopy, pp. 1-27. (Year: 2013).

Sadaf Nazneen et al., "Distribution and Sources of Carbon, Nitrogen, Phosphorus and Biogenic Silica in the Sediments of Chilika Lagoo," J. Earth Syst. Sci., 2017, vol. 126, 13 pgs., Indian Academy of Sciences.

Utpalendu Kuila et al., "Total Porosity Measurement in Gas Shales by the Water Immersion Porosimetry (WIP) Method," Fuel 117, 2014, pp. 1115-1129, Elsevier.

Zhao et al., Cross-Scale Molecular Analysis of Chemical Heterogeneity in Shale Rocks, Scientific Reports 1 (2018) 8:2552* DOI: 10. 1038/s41598-018-20365-6, www.nature.com/scientific reports, Received:Aug. 24, 2017, Accepted; Jan. 10, 2018, Published online: Feb. 7, 2018) (Year: 2018).

Gramin, P, et al., Evaluation of the Impulse Hammer Technique for Core Mechanical Properties Profiling, presented at the International Symposium of the Society of Core Analysts, Snowmass, Colorado, USA, Aug. 21-26, 2016

Ratcliffe Ken et al: "Unconventional Methods for Unconventional Plays: Using Elemental Data to Understand Shale Resource Plays, Part 1", PESA News Resources, Feb./Mar. 2012, Feb. 1, 2012 (Feb. 1, 2012), pp. 89-93, XP093122411, Retrieved from the Internet: URL:https://www.chemostrat.com/wp-content/uploads/2013/08/Shale-Exploration-Part-1.pdf [retrieved on Jan. 22, 2024].

Ratcliffe et al., Unconventional Methods for Unconventional Plays: Using Elemental Data to Understand Shale Resource Plays, Part 2, PESA News Resources, Apr./May 2012.

* cited by examiner

CRYSTALLITE SIZE IN ROCK SAMPLES

FIELD

The present disclosure concerns methods of identifying depositional forms of mineral phases in sedimentary rock samples, methods of determining amounts of excess quartz and/or terrigenous quartz in sedimentary rock samples, and methods of determining mechanical properties of rock samples, as well as associated computer programs, computer-readable media and data carrier signals.

BACKGROUND

Rocks are naturally-occurring composite materials which typically include multiple different mineralogical (e.g. mineral or mineraloid) phases. Rocks may also include organic matter (such as hydrocarbons in gaseous, liquid and/or solid form) and water.

The physicochemical properties of rocks depend on the rock composition and the distribution of different components within the rock. Compositional analysis of rock samples is therefore important in the field of geology, and is of particular importance in hydrocarbon exploration. This is because the composition of a rock sample provides information relating to the history of the rock across geological timescales (for example, providing information regarding the circumstances under which sediment was deposited or regarding the diagenetic or metamorphic processes which the sediment or rock has subsequently undergone). Information gained from the compositional analysis of rock samples can be used as an aid in identifying the likely location of subterranean hydrocarbon deposits and to determine the properties (for example, mechanical properties) of subterranean rocks which can be used, for example, in the development and interpretation of seismic models and in the calculation of rock strength, and therefore in the calculation of the pressure environments required to fracture rock (e.g. by hydraulic fracturing) or to maintain rock fractures (whether man-made or naturally occurring). Results obtained from the compositional analysis of rock samples can also be used to develop stratigraphic and depositional models of a region.

The properties of rock are often found to depend at least in part on how the rock was formed. The properties of sedimentary rock, in particular, are typically dependent on the depositional history of the rock. For example, sedimentary rock samples typically contain large amounts of silica, predominantly in the form of quartz. In particular, sedimentary rock samples may contain silica in the form of terrigenous or detrital silica, which is silica incorporated in detrital sedimentary grains (e.g. detrital quartz or feldspar grains) in the rock. Detrital sedimentary grains derive from material liberated by the weathering and erosion of pre-existing rock in the basin hinterland, transported into the basin by rivers and wind. Sedimentary rock samples may also contain silica which is not incorporated in detrital grains; this is known as excess silica. Excess silica in a rock sample can be further categorised as authigenic-excess silica or biogenic-excess silica. Authigenic-excess silica is silica that has been liberated from detrital sedimentary material by chemical weathering and precipitated within the rock. Biogenic-excess silica is silica that has been liberated from silica-rich marine organisms (e.g. plankton), such as diatoms, radiolaria, silicoflagellates and siliceous sponges, by chemical weathering and precipitated within the rock. Both biogenic-excess silica and authigenic-excess silica form part of the silica (typically quartz) cement or matrix material which surrounds and holds together the detrital grains in the rock.

Hydrocarbon explorers have found that the quality of hydrocarbon reservoirs in a region correlates with the depositional form of silica deposits in that region. For example, relatively higher proportions of excess silica, in comparison to terrigenous silica, are associated with increased hydrocarbon production. Rock parameters such as the porosity and/or mechanical properties (e.g. Young's modulus) of rocks have also been found to depend on the relative amounts of biogenic-excess silica and authigenic-excess silica in the rock. For example, biogenic-excess silica is typically more brittle than authigenic-excess silica and therefore can be easier to fracture, for example when forming hydrocarbon wells by hydraulic fracturing.

The mineralogical composition of rock samples can be determined precisely in the laboratory, for example using methods such as quantitative X-ray diffraction (QXRD). Organic phases present in the rock can also be measured using combustion analysis (e.g. using a LECO combustion instrument) or pyrolysis analysis (e.g. using a Rock-Eval pyrolysis instrument). The depositional form of phases present in the rock can be estimated based on analysis of thin sections or using compositional proxies. However, improved methods for identifying and quantifying the depositional form of the phases present in rock samples would be of benefit.

Improved methods for interpreting and/or determining the mechanical properties of rocks would also be of benefit. An improved understanding of the fracture behaviour of sub-surface sedimentary rocks would be especially useful for unconventional hydrocarbon exploration (for example, for hydraulic fracturing of rocks in lateral hydrocarbon wells).

SUMMARY

In a first aspect, a method comprises identifying a depositional form of a mineral phase in a sedimentary rock sample based on a measurement of a parameter indicative of a size of crystallites of the mineral phase in the sedimentary rock sample.

It will be appreciated that a sedimentary rock sample is a sample of sedimentary rock. Sedimentary rock is rock which was formed by the deposition and cementation of sedimentary material, particularly small particles of mineral or organic nature, on the floor of ancient bodies of water (such as oceans or lakes).

Sedimentary rocks (or constituent phases thereof) can be categorised by the origin of the sedimentary material from which the rock formed (i.e. by the depositional form of the rock (or constituent phases thereof)). For example, material (i.e. detritus) derived from weathering (i.e. erosion) of the hinterland (i.e. surroundings) of a sedimentary basin is referred to as "terrigenous" (i.e. its depositional form is "terrigenous"). Terrigenous material in sedimentary rocks therefore originally derived from terrestrial, as opposed to marine or lacustrine, environments.

Material which is not derived from weathering of the hinterland of the sedimentary basin, and which may therefore be marine or lacustrine in origin, may be referred to as "excess" (i.e. its depositional form is "excess"). For example, the silica content of sedimentary rocks may be divided into terrigenous silica (incorporated in detrital particles derived from weathering of the hinterland) and excess silica (not incorporated in detrital particles).

Excess material in the rock may also be sub-categorised by its origin. For example, the excess silica content of sedimentary rocks may be divided into authigenic-excess silica (silica that has been liberated from detrital sedimentary material by chemical weathering and reprecipitated within the rock) and biogenic silica (silica that has been liberated from silica-rich marine organisms (e.g. plankton), such as diatoms, radiolaria, silicoflagellates and siliceous sponges, by chemical weathering and precipitated within the rock).

It will therefore be appreciated that "terrigenous", "excess", "authigenic" (e.g. "authigenic-excess") and "biogenic" (e.g. "biogenic-excess") are examples of terms which specify the depositional form of sedimentary rocks or constituent phases thereof.

It will further be appreciated that rocks are typically composite materials including a plurality of constituent phases. At least one of the constituent phases is typically a mineral phase. The plurality of constituent phases may also include one or more mineraloid phases (such as opal, jet or obsidian), one or more organic phases (such as free hydrocarbons, kerogen, bitumen or pyrobitumen) or one or more other phases (such as water).

The mineral phase may be a single material, i.e. a single mineral. It will be appreciated that a mineral is a naturally-occurring, crystalline, inorganic substance which can be characterised by its chemical composition and physical properties including its crystal structure, hardness, lustre, colour, cleavage, fracture and/or density (i.e. the mineral phase is a crystalline phase, i.e. a crystalline material). Minerals can be distinguished from mineraloids (e.g. opal or obsidian) which are non-crystalline naturally-occurring mineral-like substances such as glasses.

Example minerals include quartz, stishovite, feldspar, calcite, dolomite, pyrite and clay minerals (such as kaolinite, illite and montmorillonite).

It will appreciated that a given sedimentary rock sample may comprise a particular mineral phase in two or more different depositional forms. For example, a sedimentary rock sample may comprise both terrigenous quartz and excess quartz (e.g. authigenic quartz). Alternatively, it may be that a particular mineral phase is present in the sedimentary rock sample only in a single depositional form (i.e. only one depositional form of the mineral phase is present in the sedimentary rock sample).

Accordingly, identifying a depositional form of a mineral phase in a sedimentary rock sample may comprise determining the (i.e. single) depositional form of the said mineral phase in the sedimentary rock sample (i.e. in examples in which the said mineral phase is present in a single depositional form). For example, the mineral phase may be quartz and identifying the depositional form of the quartz may comprise determining that the quartz in the sedimentary rock sample is terrigenous quartz or excess quartz (e.g. authigenic quartz). Alternatively, identifying a depositional form of the mineral phase in the sedimentary rock sample may comprise identifying one of the depositional forms of the mineral phase in the sedimentary rock sample (i.e. in examples in which the said mineral phase is present in two or more depositional forms). The method may comprise identifying two or more depositional forms (e.g. all depositional forms) of the mineral phase in the sedimentary rock sample. For example, the mineral phase may be quartz and the method may comprise determining that both terrigenous quartz and excess quartz (e.g. authigenic quartz) are present in the sedimentary rock sample.

It will be appreciated that a sedimentary rock is made up of fragments (i.e. particles) of sediment which are cemented together. Individual sedimentary fragments (i.e. particles) may be composite fragments (i.e. particles) comprising a plurality of mineral grains. Individual mineral grains are typically polycrystalline, i.e. they comprise a plurality of mineral crystallites, rather than monocrystalline. It will be understood that, throughout this specification and the appended claims, the term "crystallite" is used to refer to a coherent X-ray scattering domain (i.e. such that there is not necessarily a direct relationship between particle size and crystallite size).

The inventors have found that there is a relationship between the crystallite size and the depositional form (i.e. the depositional origin or sedimentary depositional processes which led to the formation) of the mineral phase. In particular, the inventors have found that there is a relationship between mean crystallite size and the depositional form of the mineral phase. For example, the inventors have found that terrigenous quartz tends to have a larger mean quartz crystallite size in comparison to excess (e.g. authigenic) quartz.

Accordingly, it may be that the parameter indicative of the size of crystallites of the mineral phase in the sedimentary rock sample is a parameter indicative of the mean size of crystallites of the mineral phase in the sedimentary rock sample.

It may be that the measurement of the parameter indicative of the (e.g. mean) size of crystallites of the mineral phase in the sedimentary rock sample is obtained by powder X-ray diffraction (powder XRD) (i.e. carried out on the sedimentary rock sample). Accordingly, the method may comprise measuring the value of the parameter indicative of the (e.g. mean) size of crystallites of the mineral phase in the sedimentary rock sample using powder XRD.

The parameter indicative of the (e.g. mean) size of crystallites of the mineral phase in the sedimentary rock sample may be, or may be determined based on (i.e. calculated from), a peak width of a peak associated with (i.e. characteristic of) the mineral phase in a powder X-ray diffraction pattern obtained from the sedimentary rock sample (i.e. using powder XRD). Accordingly, the method may comprise: measuring the peak width of the peak associated with the mineral phase in the powder X-ray diffraction pattern obtained from the sedimentary rock sample; and determining a value of the parameter indicative of the (e.g. mean) size of crystallites of the mineral phase in the sedimentary rock sample based on the measured peak width. The method may comprise: measuring the peak width of the peak associated with the mineral phase in the powder X-ray diffraction pattern obtained from the sedimentary rock sample; determining the value of the parameter indicative of the (e.g. mean) size of crystallites of the mineral phase in the sedimentary rock sample based on the measured peak width; and identifying the depositional form of the mineral phase in the sedimentary rock sample based on the determined value of the parameter indicative of the (e.g. mean) size of crystallites of the mineral phase in the sedimentary rock sample.

Determining the value of the parameter indicative of the (e.g. mean) size of crystallites of the mineral phase in the sedimentary rock sample based on the measured peak width may comprise: comparing the measured peak width to a reference peak width for the same peak (i.e. at the same diffraction angle) associated with the mineral phase; and determining the value of the parameter indicative of the (e.g. mean) size of crystallites of the mineral phase in the sedimentary rock sample based on the comparison. The reference peak width may be obtained from a crystalline mineral standard. Accordingly, determining the value of the parameter indicative of the (e.g. mean) size of crystallites of the mineral phase in the sedimentary rock sample based on the measured peak width may comprise: determining the line broadening of the peak associated with the mineral phase, wherein the line broadening is a measure of a difference between the measured peak width and the reference peak width; and determining the value of the parameter indicative of the (e.g. mean) size of crystallites of the mineral phase in the sedimentary rock sample based on line broadening. The line broadening may be determined at half the maximum intensity (i.e. at full width at half maximum (FWHM)) of the peak associated with the mineral phase.

For example, the mean size, $\tau$, of crystallites of a mineral in a sample which coherently scatter X-rays during powder XRD analysis can be determined using the Scherrer equation, $$\tau = \frac{K\lambda}{\beta \cos\theta},$$

where K is a dimensionless shape factor, $\lambda$ is the X-ray wavelength, $\beta$ is the line broadening at FWHM of the peak (i.e. at $2\theta$) associated with the mineral, and $\theta$ is the angle of diffraction of the said peak. In general, the mean coherently-scattering crystallite domain size, $\tau$, provides a lower bound on the mean crystallite size for the mineral. However, in practice, and to a good approximation, the mean coherently-scattering crystallite domain size, $\tau$, can be considered to be equivalent to (i.e. the same as) the mean crystallite size. Accordingly, and for the avoidance of doubt, all references herein to the mean crystallite size can be replaced mutatis mutandis by references to the mean coherently-scattering crystallite domain size, $\tau$, as determined using XRD and applying the Scherrer equation.

The method may comprise taking into account the line broadening of more than one peak associated with the mineral phase when determining the value of the parameter indicative of the (e.g. mean) size of crystallites of the mineral phase in the sedimentary rock sample. For example, the method may comprise: determining the line broadening of a plurality of peaks associated with the mineral phase (e.g. all such peaks associated with the mineral phase) across the full 26 range; and determining the value of the parameter indicative of the (e.g. mean) size of crystallites of the mineral phase in the sedimentary rock sample based on the line broadening of the plurality of peaks.

It may be that the method comprises determining an amount (e.g. a parameter indicative of a volume (e.g. total volume), such as the volume (e.g. total volume) or volume fraction (e.g. volume percentage), or a parameter indicative of a mass (e.g. total mass), such as the mass (e.g. total mass) or mass fraction (e.g. mass percentage)) of the mineral phase in the sedimentary rock sample having the identified depositional form based on the measurement of the parameter indicative of the (e.g. mean) size of crystallites of the mineral phase in the sedimentary rock sample. For example, the method may comprise determining an amount (e.g. a parameter indicative of a volume (e.g. total volume), such as the volume (e.g. total volume) or volume fraction (e.g. volume percentage), or a parameter indicative of a mass (e.g. total mass), such as the mass (e.g. total mass) or mass fraction (e.g. mass percentage)) of the mineral phase in the sedimentary rock sample having the identified depositional form based on (a) the measurement of the parameter indicative of the (e.g. mean) size of crystallites of the mineral phase in the sedimentary rock sample and (b) a measurement of an amount (e.g. the total amount) of the mineral phase in the sedimentary rock sample. Parameters indicative of mass (e.g. total mass), such as the mass (e.g. total mass) or mass fraction (e.g. mass percentage), of the mineral phase in the sedimentary rock sample having the identified depositional form may be determined directly from powder XRD measurements. Parameters indicative of volume (e.g. total volume), such as the volume (e.g. total volume) or volume fraction (e.g. volume percentage), of the mineral phase in the sedimentary rock sample having the identified depositional form may be determined (e.g. calculated) based on (a) parameters indicative of mass determined directly from powder XRD measurements and (b) a (e.g. known or estimated) density of the mineral phase.

It may be that the method comprises determining respective amounts (e.g. parameters indicative of volumes (e.g. total volumes), such as the volumes (e.g. total volumes) or volume fractions (e.g. volume percentages), or parameters indicative of mass (e.g. total mass), such as the mass (e.g. total mass) or mass fractions (e.g. mass percentages)) of the mineral phase in the sedimentary rock sample having first and second depositional forms based on the measurement of the parameter indicative of the (e.g. mean) size of crystallites of the mineral phase in the sedimentary rock sample. For example, the method may comprise determining respective amounts (e.g. parameters indicative of volumes (e.g. total volumes), such as the volumes (e.g. total volumes) or volume fractions (e.g. volume percentages), or parameters indicative of mass (e.g. total mass), such as the mass (e.g. total mass) or mass fractions (e.g. mass percentages)) of the mineral phase in the sedimentary rock sample having first and second depositional forms based on (a) the measurement of the parameter indicative of the (e.g. mean) size of crystallites of the mineral phase in the sedimentary rock sample and (b) the measurement of the amount (e.g. the total amount) of the mineral phase in the sedimentary rock sample. For example, it may be that the sedimentary rock sample contains the mineral phase only in the first and second depositional forms (i.e. no other depositional forms of the said mineral phase are present in the sedimentary rock sample, for example because only two different depositional forms of the sedimentary rock sample exist) and the method comprises: determining the relative amounts of first and second depositional forms of the mineral phase in the sedimentary rock sample (e.g. the proportion of the mineral phase in the sedimentary rock sample which has the first depositional form and the proportion of the mineral phase in the sedimentary rock sample which has the second depositional form, e.g. the ratio of the first depositional form to the second depositional form in the sedimentary rock sample) based on the measurement of the parameter indicative of the (e.g. mean) size of crystallites of the mineral phase in the sedimentary rock sample; and determining the respective (i.e. absolute) amount of each of the first and second depositional forms of the mineral phase in the sedimentary rock sample based on the determined relative amounts of the first and second depositional forms of the mineral phase in the sedimentary rock sample and the measurement of the amount (e.g. the total amount) of the said mineral phase in the sedimentary rock sample.

The amount of the mineral phase in the sedimentary rock sample having the identified depositional form may be defined (i.e. measured) relative to the amount of the said mineral phase having the identified deposition form in a different sedimentary rock sample (i.e. the amount of the mineral phase having the identified depositional form in the sedimentary rock sample may be assessed on a relative scale). That is to say, the method may comprise determining relative amounts of the mineral phase having the identified depositional form in two or more (i.e. different) sedimentary rock samples based on measurements of the parameter indicative of the (e.g. mean) size of crystallites of the mineral phase in the two or more (i.e. different) sedimentary rock samples (i.e. determining respective amounts, measured on a relative scale, of the mineral phase having the identified depositional form in two or more (i.e. different) sedimentary rock samples based on measurements of the parameter indicative of the (e.g. mean) size of crystallites of the mineral phase in the two or more (i.e. different) sedimentary rock samples).

The mineral phase may comprise (e.g. be) a crystalline form of silica (i.e. silicon dioxide ($SiO_2$)). For example, the mineral phase may be quartz. The method may be a method of identifying terrigenous quartz and/or excess quartz (for example, authigenic-excess quartz) in the sedimentary rock sample based on a measurement of a parameter indicative of a (e.g. mean) size of crystallites of quartz in the sedimentary rock sample. The method may be a method of determining a (i.e. respective) amount (e.g. a parameter indicative of a volume (e.g. total volume), such as the volume (e.g. total volume) or volume fraction (e.g. volume percentage), or a parameter indicative of a mass (e.g. total mass)) of terrigenous quartz and/or excess quartz (for example, authigenic-excess quartz) in the sedimentary rock sample based on the measurement of the parameter indicative of the (e.g. mean) size of crystallites of quartz in the sedimentary rock sample. The parameter indicative of the (e.g. mean) size of crystallites of quartz in the sedimentary rock sample may be a line broadening, determined at half the maximum intensity (i.e. at full width at half maximum (FWHM)), of a peak associated with (i.e. characteristic of) quartz in a powder X-ray diffraction pattern obtained from the sedimentary rock sample.

The sedimentary rock sample may be a siliciclastic sedimentary rock sample, i.e. a sample of siliciclastic sedimentary rock. It will be appreciated that siliciclastic sedimentary rock is clastic noncarbonate rock formed predominantly from silicate minerals such as quartz, tridymite, cristobalite, stishovite, nesosilicates, sorosilicates, cyclosilicates, inosilicates, phyllosilicates (e.g. mica) and/or tectosilicates (e.g. feldspar).

The sedimentary rock sample may be a core sample. The skilled person will appreciate that a core sample is a cylindrical section of rock having standardised dimensions. For example, a core sample may be a cylindrical section of rock having a diameter of about 1 inch. Plugs may be extracted from core samples for detailed analysis.

Alternatively, the sedimentary rock sample may be a cuttings sample. The skilled person will appreciate that a cuttings sample is a sample of drill cuttings obtained when a well is drilled. Drill cuttings typically comprise (e.g. consist of) relatively small, broken pieces of rock produced by drilling action and brought to the surface in drilling mud. Cuttings samples are commonly examined as part of mud logging (i.e. well logging) processes.

It may be that one or more steps of the method are carried out by a computer. For example, it may be that the method comprises the computer identifying the depositional form of the mineral phase in the sedimentary rock sample based on the measurement of the parameter indicative of the (e.g. mean) size of crystallites of the mineral phase in the rock sample. It may be that the method comprises the computer measuring the peak width of the peak associated with the mineral phase in the X-ray diffraction pattern obtained from the sedimentary rock sample; determining the value of the parameter indicative of the (e.g. mean) size of crystallites of the mineral phase in the sedimentary rock sample based on the measured peak width; and identifying the depositional form of the mineral phase in the sedimentary rock sample based on the determined value of the parameter indicative of the (e.g. mean) size of crystallites of the mineral phase in the sedimentary rock sample. It may be that the method comprises the computer determining the amount of the mineral phase in the sedimentary rock sample having the identified depositional form based on the measurement of the parameter indicative of the (e.g. mean) size of crystallites of the mineral phase in the sedimentary rock sample. It may be that the method comprises the computer determining respective amounts of the mineral phase in the sedimentary rock sample having first and second depositional forms based on the measurement of the parameter indicative of the (e.g. mean) size of crystallites of the mineral phase in the sedimentary rock sample.

In a second aspect, a computer program comprises instructions which, when the program is executed by a computer, cause the computer to carry out the steps of the method of the first aspect. For example, it may be that the instructions, when the program is executed by the computer, cause the computer to carry out any combination of the steps of the method of the first aspect identified hereinabove as being carried out by (or being suitable for being carried out by) a computer.

In a third aspect, there is provided a (e.g. non-transitory) computer-readable medium storing the computer program (e.g. the instructions) according to the second aspect. The computer program (e.g. the instructions) may be stored as computer-executable program code.

In a fourth aspect, there is provided a data carrier signal carrying (e.g. encoding) the computer program (e.g. the instructions) according to the second aspect. The computer program (e.g. the instructions) may be provided in the form of computer-executable program code.

In a fifth aspect, a method comprises determining an amount of excess quartz and/or an amount of terrigenous quartz in a sedimentary rock sample taking into account a measurement of an amount of quartz in the sedimentary rock sample and a measurement of a parameter indicative of a size of crystallites of quartz in the sedimentary rock sample.

It may be that the amount of excess quartz in the sedimentary rock sample is a parameter indicative of a volume (e.g. total volume) of excess quartz in the sedimentary rock sample.

The parameter indicative of the volume (e.g. total volume) of excess quartz in the sedimentary rock sample may be the volume (e.g. total volume) of excess quartz in the sedimentary rock sample. Alternatively, the parameter indicative of the volume of excess quartz in the sedimentary rock sample may be a volume fraction (e.g. a volume percentage) of excess quartz in the sedimentary rock sample (e.g. the fraction (e.g. percentage) of the total volume of the sedimentary rock sample consisting of excess quartz).

Alternatively, it may be that the amount of excess quartz in the sedimentary rock sample is a parameter indicative of a mass (e.g. total mass) of excess quartz in the sedimentary rock sample. The parameter indicative of the mass (e.g. total mass) of excess quartz in the sedimentary rock sample may be the mass (e.g. total mass) of excess quartz in the sedimentary rock sample. Alternatively, the parameter indicative of the mass of excess quartz in the sedimentary rock sample may be a mass fraction (e.g. a mass percentage) of excess quartz in the sedimentary rock sample (e.g. the fraction (e.g. percentage) of the total mass of the sedimentary rock sample consisting of excess quartz).

The excess quartz may be authigenic-excess quartz.

It may be that the amount of terrigenous quartz in the sedimentary rock sample is a parameter indicative of a volume (e.g. total volume) of terrigenous quartz in the sedimentary rock sample. The parameter indicative of the volume (e.g. total volume) of terrigenous quartz in the sedimentary rock sample may be the volume (e.g. total volume) of terrigenous quartz in the sedimentary rock sample. Alternatively, the parameter indicative of the volume of terrigenous quartz in the sedimentary rock sample may be a volume fraction (e.g. a volume percentage) of terrigenous quartz in the sedimentary rock sample (e.g. the fraction (e.g. percentage) of the total volume of the sedimentary rock sample consisting of terrigenous quartz).

Alternatively, it may be that the amount of terrigenous quartz in the sedimentary rock sample is a parameter indicative of a mass (e.g. total mass) of terrigenous quartz in the sedimentary rock sample. The parameter indicative of the mass (e.g. total mass) of terrigenous quartz in the sedimentary rock sample may be the mass (e.g. total mass) of terrigenous quartz in the sedimentary rock sample. Alternatively, the parameter indicative of the mass of terrigenous quartz in the sedimentary rock sample may be a mass fraction (e.g. a mass percentage) of terrigenous quartz in the sedimentary rock sample (e.g. the fraction (e.g. percentage) of the total mass of the sedimentary rock sample consisting of terrigenous quartz).

It will be appreciated that a sedimentary rock is made up of fragments (i.e. particles) of sediment which are cemented together. Individual sedimentary fragments (i.e. particles) may be composite fragments (i.e. particles) comprising a plurality of mineral grains. Individual mineral grains are typically polycrystalline, i.e. they comprise a plurality of mineral crystallites, rather than monocrystalline. In particular, individual mineral grains may contain polycrystalline quartz. It will be understood that, throughout this specification and the appended claims, the term "crystallite" is used to refer to a coherent X-ray scattering domain (i.e. such that there is not necessarily a direct relationship between particle size and crystallite size).

The inventors have found that there is a relationship between the crystallite size of the quartz and the depositional form (i.e. the depositional origin or sedimentary depositional processes which led to the formation) of the quartz. In particular, the inventors have found that there is a relationship between the mean size of the quartz crystallites and the depositional form of the quartz. For example, the inventors have found that terrigenous quartz tends to have a larger mean quartz crystallite size in comparison to excess (e.g. authigenic) quartz.

Accordingly, it may be that the parameter indicative of the size of crystallites of the quartz in the sedimentary rock sample is a parameter indicative of the mean size of crystallites of the quartz in the sedimentary rock sample.

It may be that the measurement of the parameter indicative of the (e.g. mean) size of crystallites of the quartz in the sedimentary rock sample is obtained by powder X-ray diffraction (XRD) (i.e. carried out on the sedimentary rock sample). Accordingly, the method may comprise measuring the value of the parameter indicative of the (e.g. mean) size of crystallites of the quartz in the sedimentary rock sample using powder XRD.

The parameter indicative of the (e.g. mean) size of crystallites of the quartz in the sedimentary rock sample may be, or may be determined based on (i.e. calculated from), a peak width of a peak associated with (i.e. characteristic of) quartz in a powder X-ray diffraction pattern obtained from the sedimentary rock sample (i.e. using powder XRD). Accordingly, the method may comprise: measuring the peak width of the peak associated with (i.e. characteristic of) quartz in the powder X-ray diffraction pattern obtained from the sedimentary rock sample; and determining a value of the parameter indicative of the (e.g. mean) size of crystallites of the quartz in the sedimentary rock sample based on the measured peak width. The method may comprise: measuring the peak width of the peak associated with (i.e. characteristic of) quartz in the powder X-ray diffraction pattern obtained from the sedimentary rock sample; determining the value of the parameter indicative of the (e.g. mean) size of crystallites of the quartz in the sedimentary rock sample based on the measured peak width; and identifying the depositional form of the quartz in the sedimentary rock sample based on the determined value of the parameter indicative of the (e.g. mean) size of crystallites of the quartz in the sedimentary rock sample.

Determining the value of the parameter indicative of the (e.g. mean) size of crystallites of the quartz in the sedimentary rock sample based on the measured peak width may comprise: comparing the measured peak width to a reference peak width for the same peak (i.e. at the same diffraction angle) associated with the quartz; and determining the value of the parameter indicative of the (e.g. mean) size of crystallites of the quartz in the sedimentary rock sample based on the comparison. The reference peak width may be obtained from a crystalline quartz standard. Accordingly, determining the value of the parameter indicative of the (e.g. mean) size of crystallites of the quartz in the sedimentary rock sample based on the measured peak width may comprise: determining the line broadening of the peak associated with the quartz, wherein the line broadening is a measure of a difference between the measured peak width and the reference peak width; and determining the value of the parameter indicative of the (e.g. mean) size of crystallites of the quartz in the sedimentary rock sample based on line broadening. The line broadening may be determined at half the maximum intensity (i.e. at full width at half maximum (FWHM)) of the peak associated with the quartz.

For example, the mean size, $\tau$, of quartz crystallite domains in a sample which coherently scatter X-rays during XRD (e.g. powder XRD) analysis can be determined using the Scherrer equation, $$\tau = \frac{K\lambda}{\beta \cos\theta},$$

where K is a dimensionless shape factor, $\lambda$ is the X-ray wavelength, $\beta$ is the line broadening at FWHM of the peak (i.e. at 2$\theta$) associated with quartz, and $\theta$ is the angle of diffraction of the peak associated with quartz. In general, the mean coherently-scattering crystalline domain size, $\tau$, provides a lower bound on the mean quartz crystallite size. However, in practice, and to a good approximation, the mean coherently-scattering crystallite domain size, $\tau$, can be considered to be equivalent to (i.e. the same as) the mean quartz crystallite size. However, and for the avoidance of doubt, all references herein to the mean quartz crystallite size can be replaced mutatis mutandis by references to the mean coherently-scattering crystallite domain size, τ, as determined using powder XRD and applying the Scherrer equation.

The method may comprise taking into account the line broadening of more than one peak associated with quartz when determining the value of the parameter indicative of the (e.g. mean) size of crystallites of quartz in the sedimentary rock sample. For example, the method may comprise: determining the line broadening of a plurality of peaks associated with quartz (e.g. all such peaks associated with quartz) across the full 2θ range; and determining the value of the parameter indicative of the (e.g. mean) size of crystallites of quartz in the sedimentary rock sample based on the line broadening of the plurality of peaks.

It may be that determining the amount of excess quartz in the sedimentary rock sample and/or the amount of terrigenous quartz in the sedimentary rock sample comprises taking into account a relationship between measurements of amounts of terrigenous quartz and/or excess quartz and measurements of the parameter indicative of the (e.g. mean) size of crystallites of quartz for sedimentary rock samples. For example, the inventors have found that sedimentary rock samples having larger quartz crystallites tend to exhibit lower Si/Zr content ratios, and lower Si/Zr content ratios tend to be associated with higher terrigenous quartz contents (and correspondingly lower excess quartz contents). In contrast, sedimentary rock samples having smaller quartz crystallites tend to exhibit higher Si/Zr content ratios, and higher Si/Zr content ratios tend to be associated with lower terrigenous quartz contents (and correspondingly higher excess quartz contents). The abundance of zirconium in a sedimentary rock is typically dependent on the proportion of the rock which is of terrigenous origin because, as it is understood, sedimentary rocks could only have been enriched in the trace element zirconium by erosion of the hinterland surrounding a sedimentary basin, since zirconium was not typically present in ancient biological organisms, nor was it dissolved in ancient bodies of waters such as lakes or oceans in sedimentary basins (see, for example, RATCLIFFE et al., *Unconventional Methods For Unconventional Plays: Using Elemental Data To Understand Shale Resource Plays, Part 2*, PESA News Resources, April/May 2012, which is hereby incorporated by reference in its entirety).

The relationship between measurements of amounts of terrigenous quartz and measurements of the parameter indicative of the (e.g. mean) size of crystallites of quartz for sedimentary rock samples may be a linear relationship between amounts of terrigenous quartz and measurements of the parameter indicative of the (e.g. mean) size of crystallites of quartz for sedimentary rock samples. That is to say, it may be that measurements of amounts of terrigenous quartz and measurements of the parameter indicative of the (e.g. mean) size of crystallites of quartz are in direct proportion to one another. Accordingly, it may be that the relationship between measurements of amounts of terrigenous quartz and measurements of the parameter indicative of the (e.g. mean) size of crystallites of quartz for sedimentary rock samples is a ratio between measurements of amounts of terrigenous quartz and measurements of the parameter indicative of the (e.g. mean) size of crystallites of quartz for sedimentary rock samples. The method may therefore comprise: determining the amount of terrigenous quartz in the sedimentary rock sample taking into account the measurement of the parameter indicative of the (e.g. mean) size of crystallites of quartz in the sedimentary rock sample and the relationship (e.g. linear relationship, for example ratio) between measurements of amounts of terrigenous quartz and measurements of the parameter indicative of the (e.g. mean) size of crystallites of quartz for sedimentary rock samples, and the measurement of the amount of quartz in the sedimentary rock sample; and determining the amount of excess quartz in the sedimentary rock sample based on the determined amount of terrigenous quartz in the sedimentary rock sample and the measurement of the amount of quartz in the sedimentary rock sample. The method may comprise determining the amount of excess quartz in the sedimentary rock sample as the difference between the measurement of the amount of quartz in the rock sample and the determined amount of terrigenous quartz in the rock sample.

The sedimentary rock sample may be a siliciclastic sedimentary rock sample, i.e. a sample of siliciclastic sedimentary rock. It will be appreciated that siliciclastic sedimentary rock is clastic noncarbonate rock formed predominantly from silicate minerals such as quartz, tridymite, cristobalite, stishovite, nesosilicates, sorosilicates, cyclosilicates, inosilicates, phyllosilicates (e.g. mica) and/or tectosilicates (e.g. feldspar).

The sedimentary rock sample may be a core sample. The skilled person will appreciate that a core sample is a cylindrical section of rock having standardised dimensions. For example, a core sample may be a cylindrical section of rock having a diameter of about 1 inch. Plugs may be extracted from core samples for detailed analysis.

Alternatively, the sedimentary rock sample may be a cuttings sample. The skilled person will appreciate that a cuttings sample is a sample of drill cuttings obtained when a well is drilled. Drill cuttings typically comprise (e.g. consist of) relatively small, broken pieces of rock produced by drilling action and brought to the surface in drilling mud. Cuttings samples are commonly examined as part of mud logging (i.e. well logging) processes.

It may be that one or more steps of the method are carried out by a computer. For example, it may be that the method comprises the computer determining the amount of excess quartz and/or the amount of terrigenous quartz in the sedimentary rock sample taking into account the measurement of the amount of quartz in the sedimentary rock sample and the measurement of the parameter indicative of the (e.g. mean) size of crystallites of quartz in the sedimentary rock sample. The method may comprise the computer: measuring the peak width of the peak associated with quartz in the X-ray diffraction pattern obtained from the sedimentary rock sample; and determining the value of the parameter indicative of the (e.g. mean) size of crystallites of quartz in the sedimentary rock sample based on the measured peak width. The method may comprise the computer determining the amount of excess quartz in the sedimentary rock sample and/or the amount of terrigenous quartz in the sedimentary rock sample taking into account the relationship between measurements of amounts of terrigenous quartz and measurements of the parameter indicative of the (e.g. mean) size of crystallites of quartz for sedimentary rock samples.

In a sixth aspect, there is provided a computer program comprising instructions which, when the program is executed by a computer, cause the computer to carry out the steps of the method of the fifth aspect. For example, it may be that the instructions, when the program is executed by the computer, cause the computer to carry out any combination of the steps of the method of the fifth aspect identified hereinabove as being carried out by (or being suitable for being carried out by) a computer.

In a seventh aspect, there is provided a (e.g. non-transitory) computer-readable medium storing the computer program (e.g. the instructions) according to the sixth aspect.

The computer program (e.g. the instructions) may be stored as computer-executable program code.

In an eighth aspect, there is provided a data carrier signal carrying (e.g. encoding) the computer program (e.g. the instructions) according to the sixth aspect. The computer program (e.g. the instructions) may be provided in the form of computer-executable program code.

In a ninth aspect, a method comprises determining (e.g. calculating or estimating) a mechanical property of a rock sample taking into account: a respective amount of each of two or more constituent phases in the rock sample, the two or more constituent phases comprising a mineral phase; and a measurement of a parameter indicative of a size of crystallites of the mineral phase in the rock sample.

The method may comprise determining (e.g. calculating or estimating) the mechanical property of the rock sample based on a (e.g. mathematical) relationship between (a) the mechanical property of rock samples, (b) amounts of each of the two or more constituent phases in rock samples, and (c) measurements of the parameter indicative of the size of crystallites of the mineral phase in rock samples. For example, it may be that: the mechanical property of the rock sample can be expressed in terms of (i.e. as) a (e.g. linear, for example linear predictor) function of the respective amounts of each of the two or more constituent phases in the rock sample and the parameter indicative of the size of crystallites of the mineral phase in the rock sample; and the method comprises evaluating the function. The (e.g. linear, for example linear predictor) function may be obtained (e.g. parametrised) by regression (e.g. linear regression, for example multiple linear regression) analysis.

The method may comprise carrying out the regression (e.g. linear regression, for example multiple linear regression) analysis, based on reference data (e.g. reference mechanical property data, constituent phase compositional data and mineral phase crystallite size data), prior to determining the mechanical property of the rock sample.

The method may comprise determining (for example, estimating or measuring (e.g. directly or indirectly)) the respective amount of the two or more constituent phases in the rock sample. The method may comprise measuring the parameter indicative of the size of crystallites of the mineral phase in the rock sample. The method may comprise determining (e.g. calculating) the mechanical property of the rock sample taking into account: the respective determined (e.g. estimated or measured) amount of each of the two or more constituent phases; and the measurement of the parameter indicative of the size of crystallites of the mineral phase in the rock sample.

It will be appreciated that each constituent phase is substantially chemically and/or structurally distinct. Each constituent phase is also typically substantially chemically and/or structurally homogeneous. Nevertheless, each constituent phase need not be a single material but may be a composite of two or more materials (i.e. together forming a composite phase). Each constituent phase is not necessarily located in one (e.g. contiguous) region of the rock sample but may be distributed across a plurality of (e.g. separate) regions of the rock sample. For example, it may be that different regions of a first constituent phase in the rock sample are spaced apart from one another by one or more second constituent phases in the rock sample.

It will further be appreciated that the method does not necessarily comprise determining and/or taking into account the amount of all constituent phases in the rock sample. Instead, the two or more constituent phases determined and/or taken into account may be a subset of the total number of constituent phases in the rock sample. For example, it may be that one or more minor constituent phases in the rock sample are present in negligible amounts and, therefore, it is not necessary to take into account the presence of the one or more minor constituent phases in the rock sample when determining the mechanical property of the rock sample.

However, the two or more constituent phases determined and/or taken into account may comprise (e.g. be) a majority of the constituent phases in the rock sample. For example, the two or more constituent phases determined and/or taken into account may together constitute no less than about 80%, for example, no less than about 90%, or no less than about 95%, or no less than about 99%, of the total volume of the rock. Nevertheless, in some examples, the two or more constituent phases determined and/or taken into account constitute all of the constituent phases in the rock sample.

The respective amounts of the two or more constituent phases may be determined by any suitable methods known in the art, including spectroscopic methods (e.g. infra-red spectroscopy or X-ray fluorescence), crystallographic methods (e.g. X-ray diffraction), combustion analysis methods (e.g. LECO combustion analysis methods, for example using a combustion analyser such as available from LECO Corporation, Saint Joseph, Michigan, USA) and/or pyrolysis analysis methods (e.g. Rock-Eval pyrolysis analysis methods, for example using a Rock-Eval analyser available from Vinci Technologies SA, Nanterre, France).

It may be that the parameter indicative of the size of crystallites of the mineral phase in the rock sample is a parameter indicative of the mean size of crystallites of the mineral phase in the rock sample.

It may be that the measurement of the parameter indicative of (e.g. mean) size of crystallites of the mineral phase in the rock sample is obtained by powder X-ray diffraction (powder XRD) (i.e. carried out on the rock sample). Accordingly, the method may comprise measuring the value of the parameter indicative of the (e.g. mean) size of crystallites of the mineral phase in the rock sample using powder XRD.

The parameter indicative of the (e.g. mean) size of crystallites of the mineral phase in the rock sample may be, or may be determined based on (i.e. calculated from), a peak width of a peak associated with (i.e. characteristic of) the mineral phase in a powder X-ray diffraction pattern obtained from the rock sample (i.e. using powder XRD). Accordingly, the method may comprise: measuring the peak width of the peak associated with the mineral phase in the powder X-ray diffraction pattern obtained from the rock sample; and determining a value of the parameter indicative of the (e.g. mean) size of crystallites of the mineral phase in the rock sample based on the measured peak width. The method may comprise: measuring the peak width of the peak associated with the mineral phase in the powder X-ray diffraction pattern obtained from the rock sample; determining the value of the parameter indicative of the (e.g. mean) size of crystallites of the mineral phase in the rock sample based on the measured peak width; and identifying the depositional form of the mineral phase in the rock sample based on the determined value of the parameter indicative of the (e.g. mean) size of crystallites of the mineral phase in the rock sample.

Determining the value of the parameter indicative of the (e.g. mean) size of crystallites of the mineral phase in the rock sample based on the measured peak width may comprise: comparing the measured peak width to a reference peak width for the same peak (i.e. at the same diffraction angle) associated with the mineral phase; and determining the value of the parameter indicative of the (e.g. mean) size of crystallites of the mineral phase in the rock sample based on the comparison. The reference peak width may be obtained from a crystalline mineral standard. Accordingly, determining the value of the parameter indicative of the (e.g. mean) size of crystallites of the mineral phase in the rock sample based on the measured peak width may comprise: determining the line broadening of the peak associated with the mineral phase, wherein the line broadening is a measure of a difference between the measured peak width and the reference peak width; and determining the value of the parameter indicative of the (e.g. mean) size of crystallites of the mineral phase in the rock sample based on line broadening. The line broadening may be determined at half the maximum intensity (i.e. at full width at half maximum (FWHM)) of the peak associated with the mineral phase.

For example, the mean size, $\tau$, of crystallites in a sample which coherently scatter X-rays during powder XRD analysis can be determined using the Scherrer equation, $$\tau = \frac{K\lambda}{\beta \cos\theta},$$

where K is a dimensionless shape factor, $\lambda$ is the X-ray wavelength, $\beta$ is the line broadening at FWHM of the peak (i.e. at 2$\theta$) associated with the mineral phase and $\theta$ is the angle of diffraction of the said peak. In general, the mean coherently-scattering crystallite domain size, $\tau$, provides a lower bound on the mean mineral crystallite size. However, in practice, and to a good approximation, the mean coherently-scattering crystallite domain size, $\tau$, can be considered to be equivalent to (i.e. the same as) the mean mineral crystallite size. Accordingly, and for the avoidance of doubt, all references herein to the mean mineral crystallite size can be replaced mutatis mutandis by references to the mean coherently-scattering crystallite domain size, $\tau$, as determined using powder XRD and applying the Scherrer equation.

The method may comprise taking into account the line broadening of more than one peak associated with the mineral phase when determining the value of the parameter indicative of the (e.g. mean) size of crystallites of the mineral phase in the sedimentary rock sample. For example, the method may comprise: determining the line broadening of a plurality of peaks associated with the mineral phase (e.g. all such peaks associated with the mineral phase) across the full 2$\theta$ range; and determining the value of the parameter indicative of the (e.g. mean) size of crystallites of the mineral phase in the sedimentary rock sample based on the line broadening of the plurality of peaks.

The method may take into account respective measurements of the parameter indicative of a size of crystallites of more than one of the two or more constituent phases in the rock sample.

For example, the method may comprise determining the mechanical property of the rock sample taking into account: the respective amount of each of two or more constituent phases in the rock sample, the two or more constituent phases comprising the mineral phase; and respective measurements of the parameter indicative of a size of crystallites for a plurality (e.g. all) of the two or more constituent phases in the rock sample, the plurality of the two or more constituent phases including the mineral phase.

It may be that the amount of each constituent phase in the rock sample is a parameter indicative of a mass (e.g. total mass) of the said constituent phase in the rock sample. The parameter indicative of a mass (e.g. total mass) of the said constituent phase in the rock sample may be a mass (e.g. total mass) of the said constituent phase in the rock sample. Alternatively, the parameter indicative of a mass of the said constituent phase in the rock sample may be a mass fraction (e.g. mass percentage) of the said constituent phase in the rock sample (e.g. the fraction of the total mass of the rock sample constituted by the said constituent phase).

Accordingly, the method may comprise determining the mechanical property of the rock sample based on a (e.g. mathematical) relationship between (a) the mechanical property of rock samples, (b) respective parameters indicative of the mass of (e.g. the mass (e.g. total mass) of or the mass fraction (e.g. mass percentage) of) each of the two or more constituent phases in rock samples, and (c) the parameter indicative of the (e.g. mean) size of crystallites of the mineral phase in rock samples (e.g. respective parameters indicative of the (e.g. mean) size of crystallites of a plurality (e.g. all) of the two or more constituent phases in rock samples, the plurality of the two or more constituent phases including the mineral phase). For example, it may be that: the mechanical property of the rock sample can be expressed in terms of (i.e. as) a (e.g. linear, for example linear predictor) function of (a) the respective parameters indicative of the mass of (e.g. the mass (e.g. total mass) of or the mass fraction (e.g. mass percentage) of) each of the two or more constituent phases in the rock sample and (b) the parameter indicative of the size of crystallites of the mineral phase in the rock sample (e.g. respective parameters indicative of the (e.g. mean) size of crystallites of a plurality (e.g. all) of the two or more constituent phases in the rock sample, the plurality of the two or more constituent phases including the mineral phase); and the method comprises evaluating the said (e.g. linear, for example linear predictor) function.

For example, the mechanical property, $P_{Rock}$, of the rock sample may be expressed as a linear function of (a) the mass fraction, $W_X$, (e.g. in mass %) of each constituent component (i.e., phase), X=A, B, C . . . , in the rock and (b) the mean size of crystallites of phase A, $\tau_A$, in the rock as $$P_{Rock} = I + a_A \tau_A W_A + a_B W_B + a_C W_C + \ldots,$$

where: I is a constant; $a_X$ is a constant coefficient associated with each component (i.e. phase) X; the sum is taken over all components X=A, B, C . . . in the rock; and phase A is a mineral phase. The values of I and $a_X$ may be determined by (i.e. multiple) linear regression analysis, for example using a least squares algorithm. The values of $\tau_A$ and $W_X$ may be obtained by measurement as discussed hereinabove.

In some examples, the mechanical property, $P_{Rock}$, of the rock sample may be expressed as a linear function of (a) the mass fraction, $W_X$, (e.g. in mass %) of each constituent component (i.e., phase), X=A, B, C . . . , in the rock and (b) the mean size of crystallites of phase A, $\tau_A$, and phase B, $\tau_B$, in the rock as $$P_{Rock} = I + a_A \tau_A W_A + a_B \tau_B W_B + a_C W_C + \ldots.$$

In some examples, the mechanical property, $P_{Rock}$, of the rock sample may be expressed as a linear function of (a) the mass fraction, $W_X$, (e.g. in mass %) of each constituent component (i.e., phase), X=A, B, C . . . , in the rock and (b) the mean size of crystallites, $T_X$, of each constituent phase in the rock as $$P_{Rock} = + a_A T_A W_A + a_B \tau_B W_B + a_C T_C W_C + \ldots.$$

The mechanical property of the rock sample may be a static mechanical property of the rock sample, such as an elastic modulus of the rock sample, a dimensionless mechanical property ratio, or a composite static mechanical property (i.e. such that the method may be a method of determining a static mechanical property such as an elastic modulus, a dimensionless mechanical property ratio or a composite static mechanical property of the rock sample). The elastic modulus may be the Young's modulus of the rock sample (i.e. a measure of the resistance of the rock sample to elastic deformation under uniaxial stretching or compression, i.e. the stiffness of the rock sample). The elastic modulus may be the shear modulus of the rock sample (i.e. a measure of the resistance of the rock sample to elastic shear strain). The elastic modulus may be the bulk modulus of the rock sample (i.e. a measure of the resistance of the rock sample to elastic deformation under hydrostatic pressure). The dimensionless mechanical property ratio may be the Poisson's ratio of the rock sample (i.e. the ratio of the lateral and longitudinal strains induced in the rock sample when it is subjected to uniaxial tensile stress). An example of a composite static mechanical property is the reduced Young's modulus, $E^*$, defined according to:

$$E^* = \frac{E}{(1-v^2)},$$

where E is Young's modulus and v is Poisson's ratio.

The mineral phase may comprise (e.g. be) a crystalline form of silica (i.e. silicon dioxide ($SiO_2$)). For example, the mineral phase may be quartz.

It may be that the rock sample is sedimentary rock sample. The sedimentary rock sample may be a siliciclastic sedimentary rock sample, i.e. a sample of siliciclastic sedimentary rock. It will be appreciated that siliciclastic sedimentary rock is clastic noncarbonate rock formed predominantly from silicate minerals such as quartz, tridymite, cristobalite, stishovite, nesosilicates, sorosilicates, cyclosilicates, inosilicates, phyllosilicates (e.g. mica) and/or tectosilicates (e.g. feldspar).

The rock sample may be a core sample. The skilled person will appreciate that a core sample is a cylindrical section of rock having standardised dimensions. For example, a core sample may be a cylindrical section of rock having a diameter of about 1 inch. Plugs may be extracted from core samples for detailed analysis.

Alternatively, the rock sample may be a cuttings sample. The skilled person will appreciate that a cuttings sample is a sample of drill cuttings obtained when a well is drilled. Drill cuttings typically comprise (e.g. consist of) relatively small, broken pieces of rock produced by drilling action and brought to the surface in drilling mud. Cuttings samples are commonly examined as part of mud logging (i.e. well logging) processes.

It may be that one or more steps of the method are carried out by a computer. For example, it may be that the method comprises the computer determining the mechanical property of the rock sample taking into account: the respective amount of each of the two or more constituent phases in the rock sample, the two or more constituent phases comprising the mineral phase; and the measurement of the parameter indicative of the (e.g. mean) size of crystallites of the mineral phase in the rock sample. The method may comprise the computer: measuring the peak width of the peak associated with the mineral phase in the X-ray diffraction pattern obtained from the rock sample; and determining the value of the parameter indicative of the (e.g. mean) size of crystallites of the mineral phase in the rock sample based on the measured peak width. The method may comprise the computer: determining the mechanical property of the rock sample based on a (e.g. mathematical) relationship between the mechanical property of the rock sample, respective amounts of each of the two or more constituent phases in the rock sample, and the parameter indicative of the (e.g. mean) size of crystallites of the mineral phase in the rock sample. For example, the method may comprise the computer: evaluating the (e.g. linear) function of the respective amounts of each of the two or more constituent phases in the rock sample and the parameter indicative of the (e.g. mean) size of crystallites of the mineral phase in the rock sample to determine the mechanical property of the rock sample. The method may comprise the computer obtaining the (e.g. linear, for example linear predictor) function by regression (e.g. linear regression, for example multiple linear regression) analysis.

In a tenth aspect, a computer program comprises instructions which, when the program is executed by a computer, cause the computer to carry out the steps of the method of the ninth aspect. For example, it may be that the instructions, when the program is executed by the computer, cause the computer to carry out any combination of the steps of the method of the ninth aspect identified hereinabove as being carried out by (or being suitable for being carried out by) a computer.

In an eleventh aspect, there is provided a (e.g. non-transitory) computer-readable medium storing the computer program (e.g. the instructions) according to the tenth aspect. The computer program (e.g. the instructions) may be stored as computer-executable program code.

In a twelfth aspect, there is provided a data carrier signal carrying (e.g. encoding) the computer program (e.g. the instructions) according to the tenth aspect. The computer program (e.g. the instructions) may be provided in the form of computer-executable program code.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

FIGURES

Embodiments will now be described by way of example only, with reference to the Figures, in which.

DETAILED DESCRIPTION

Rocks

Figure 1:
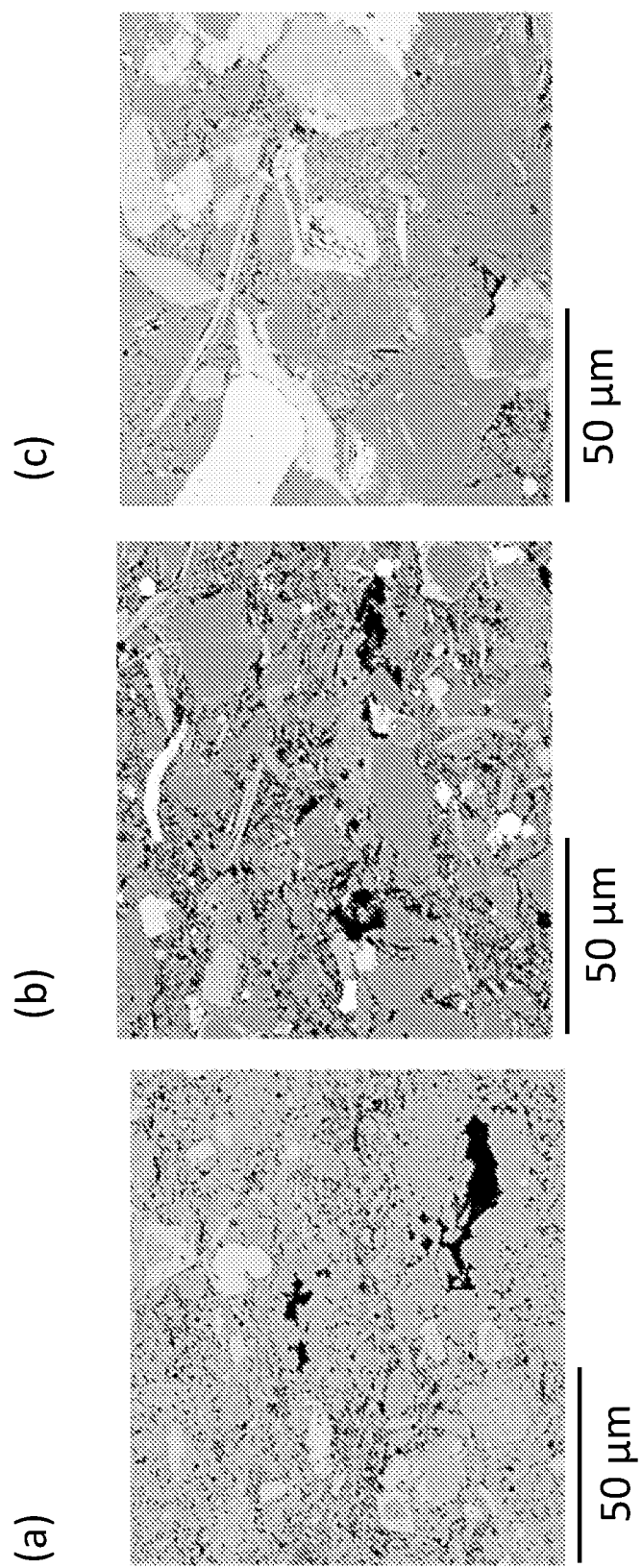
FIG. 1 is shows scanning electron micrograph (SEM) images of thin sections of three different sedimentary rock samples (a), (b) and (c)

Rocks are naturally-occurring composite materials. That is to say, rocks are not typically chemically or structurally homogeneous materials, but are instead aggregates of different phases having different chemical compositions and structures. For example, rocks typically include multiple different mineral or mineraloid (i.e. non-crystalline mineral-like substances, such as opal or obsidian) phases, and may also contain organic matter, as well liquids (such as water or hydrocarbons) trapped in pores.

Silica (i.e. $SiO_2$) is a common component of rocks, particularly sedimentary rocks, and may be present in several different forms (e.g. as quartz, amorphous silica or cristobalite). Sedimentary rocks are rocks which were formed at or near the Earth's surface by the accumulation and lithification of material. The material from which sedimentary rocks formed may have been transported into a sedimentary basin from its surroundings by rivers or wind (i.e. allogenic material) or may have been generated where it is now found (i.e. authigenic material).

Accordingly, the silica present in sedimentary rocks can be classified in terms of its origin. Terrigenous or detrital silica in a sedimentary rock is silica incorporated in detrital sedimentary grains in the rock. Detrital sedimentary grains derive originally from weathered material transported into the basin from its hinterland by wind or water (i.e. it is allogenic in origin). Excess silica in a sedimentary rock is silica present in the rock not incorporated in detrital sedimentary grains. Excess silica in sedimentary rocks can be further categorised as biogenic-excess silica or authigenic-excess silica. Biogenic-excess silica was formed by (re)precipitation of silica liberated from prehistoric biota (such as diatoms, radiolaria, silicoflagellates and siliceous sponges) by chemical weathering. Authigenic-excess silica was formed by (re)precipitation of silica liberated from detrital sedimentary material by chemical weathering. Both biogenic-excess silica and authigenic-excess silica form part of the silica (typically quartz) cement or matrix material which surrounds and holds together the detrital grains in the rock.

Hydrocarbon explorers have found that the quality of hydrocarbon reservoirs in a region correlates with the type of silica deposits in that region. For example, relatively higher proportions of excess silica, in comparison to terrigenous/detrital silica, in the rock are associated with increased hydrocarbon production from hydrocarbon wells. Rock parameters such as the porosity and/or mechanical properties (e.g. Young's modulus) of rocks have also been found to depend on the relative amounts of terrigenous and excess silica, as well as biogenic-excess silica and authigenic-excess silica, in the rock. Material which is more brittle is easier to fracture, for example when forming hydrocarbon wells (such as lateral wells used to extract hydrocarbons from unconventional sources such as tight rock formations) by hydraulic fracturing. Knowledge of the silica content of rock samples extracted from a region can therefore help in identifying the best locations for drilling well bores and in determining the properties of subterranean rock strata which can be used, for example, in the development and interpretation of seismic models and in the calculation of rock strength, and therefore in the calculation of the pressure environments required to fracture rock (e.g. by hydraulic fracturing) or to maintain rock fractures (whether man-made or naturally occurring).

The mineralogical composition of rock samples extracted from hydrocarbon wells can be determined precisely in the laboratory, for example using methods such as quantitative X-ray diffraction (QXRD). The presence of organic phases in the rock can also be determined using combustion or pyrolysis analysis methods (e.g. using a LECO instrument for combustion analysis or a Rock-Eval instrument for pyrolysis analysis). The origins of mineral phases (such as quartz) in rocks can also be studied by analysis of thin sections or using isotope geochemical methods. However, alternative and improved methods for determining the depositional form of minerals such as quartz in rock samples would not only yield valuable information about geologic history but could also help in our understanding of the geomechanical properties of sedimentary rocks, enabling improvements in geomechanical prediction.

Terrigenous Quartz and Excess Quartz Content

It has been found that the terrigenous/detrital quartz content of sedimentary rocks correlates with the abundance of the trace element zirconium (Zr) in the rock. For example, RATCLIFFE et al., *Unconventional Methods For Unconventional Plays: Using Elemental Data To Understand Shale Resource Plays*, Part 2, PESA News Resources, April/May 2012 (which is hereby incorporated by reference in its entirety) identified a positive linear relationship between the terrigenous (i.e. terrestrial) quartz content and the zirconium content of shale rock samples extracted from the Haynesville formation in the United States of America.

This trend is understood on the basis that zirconium in sedimentary rocks derives predominantly or entirely from detrital fragments of older rocks (and, in particular, zircon-containing rocks) incorporated in the sedimentary rock and that the abundance of zirconium in sedimentary rocks could not have been enriched significantly by biological activity, nor by (re)precipitation of dissolved silica from ancient bodies of water. Accordingly, it can be assumed that sedimentary rock material containing zirconium is terrigenous in origin. The abundance of zirconium in sedimentary rocks, and in particular the ratio of silicon to zirconium (Si/Zr) content in sedimentary rocks, can therefore be used as a proxy for quantifying the amount of the silica in the rock which is terrigenous in origin (i.e. which derived from the basin hinterland). Moreover, since, by definition, all of the quartz in a sedimentary rock is either terrigenous or excess in nature (in particular, because excess quartz is defined as being that quartz which is not terrigenous in origin), the abundance of zirconium in sedimentary rocks can be used to quantify the amount of excess quartz present in the rock.

The present inventors have found that the amounts of terrigenous and excess quartz in sedimentary rock can also be determined by considering the size of quartz crystallites in the rock. For example, FIGS. 1 (a) to (c) show scanning electron micrograph (SEM) images (at the same magnification) of thin sections taken from three different sedimentary rock samples. Going from (a) to (c), the observed quartz crystallite size increases while the amounts of authigenic (i.e. excess) quartz identified decreases. In general, larger quartz crystallites have been found to be associated with more terrigenous deposition and smaller quartz crystallites have been to be associated with more authigenic deposition.

Figure 2:
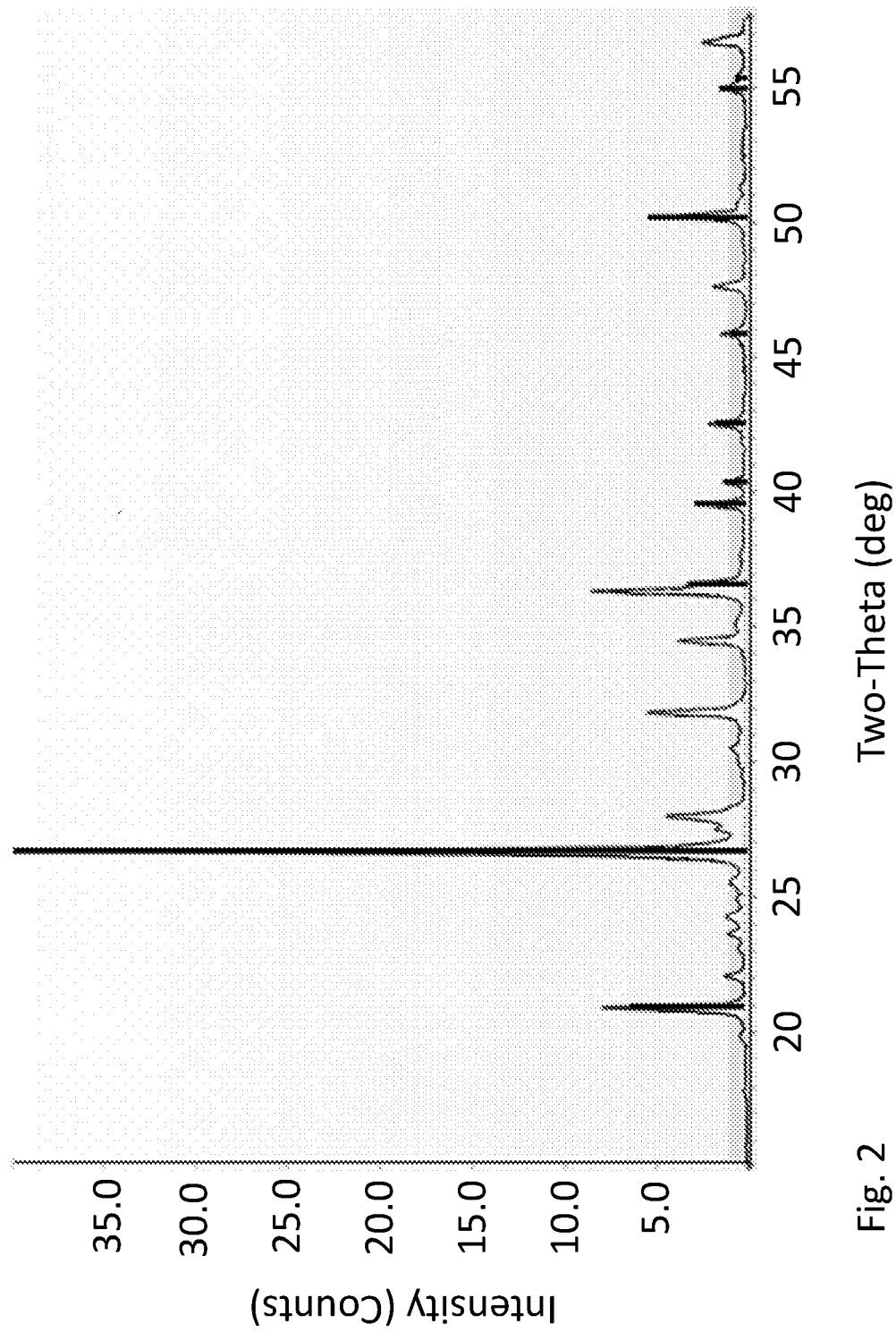
FIG. 2 is an example powder X-ray diffraction pattern for a sedimentary rock sample overlayed with reference peaks for quartz.

The size of quartz crystallites can be estimated based on the broadening of peaks measured in a powder X-ray diffraction (XRD) pattern obtained from a sample. For example, FIG. 2 shows an example powder XRD pattern obtained from a sedimentary rock sample. Reference peaks associated with quartz are superimposed on the sample diffraction pattern. The significant overlap of the peaks in the measured XRD pattern with the reference peaks indicates that quartz is indeed present in the sedimentary rock sample. In addition, the broadening of the measured peaks relative to the sharp reference peaks provides a measure of the size of the quartz crystallites present in the sample.

More particularly, the mean size, $\tau$, of crystalline domains of a particular mineral in a sample which coherently scatter X-rays during powder XRD analysis can be determined based on the broadening of a peak in the powder XRD pattern using the Scherrer equation, $$\tau = \frac{K\lambda}{\beta \cos\theta},$$

where K is a dimensionless shape factor (which typically has a value of about 0.9), $\lambda$ is the X-ray wavelength, $\beta$ is the line broadening at full-width half-maximum (FWHM) of the peak at a scattering angle, $2\theta$, in the XRD pattern associated with the mineral, and $\theta$ is the corresponding angle of diffraction. It will be appreciated that, at least in theory, the mean coherently-scattering crystalline domain size, $\tau$, is not the same as the mean mineral crystallite size. However, $\tau$ does define a lower bound on the mean crystallite size and, in practice, the mean crystallite size is generally found to correlate with $\tau$ such that, to a good approximation, $\tau$ can be used as a proxy for the mean crystallite size. It will be appreciated, however, that peak broadening only takes place, and therefore the Scherrer equation is only applicable, when the mean crystallite size is less than about 10000 Ångströms.

Those skilled in the art will appreciate that, although the Scherrer equation presented above relates to the broadening of a single XRD peak, the mean coherently-scattering crystalline domain size can be determined on the basis of a plurality of peaks associated with the mineral in question. For example, if the profile coefficients (i.e. FWHM or $\beta$) are parameterized as a function of $$\frac{1}{\cos\theta},$$

crystallite size information can be extracted across the full range of $2\theta$, provided that enough peaks are present in the diffraction pattern for a robust assessment.

XRD analysis software, suitable for use in determining the value of $\tau$, is commercially available. One example is JADE available from Materials Data Inc, CA, USA.

Measurements carried out on reference samples (e.g. lanthanum hexaboride (LaB$_6$) powder (e.g. NIST line position and line shape standard SRM 660C)) can be used to subtract instrument contributions to the peak broadening.

Those skilled in the art will further appreciate that there are alternative methods for determining crystallite size information from powder XRD measurements. For example, . . . .

Figure 3:
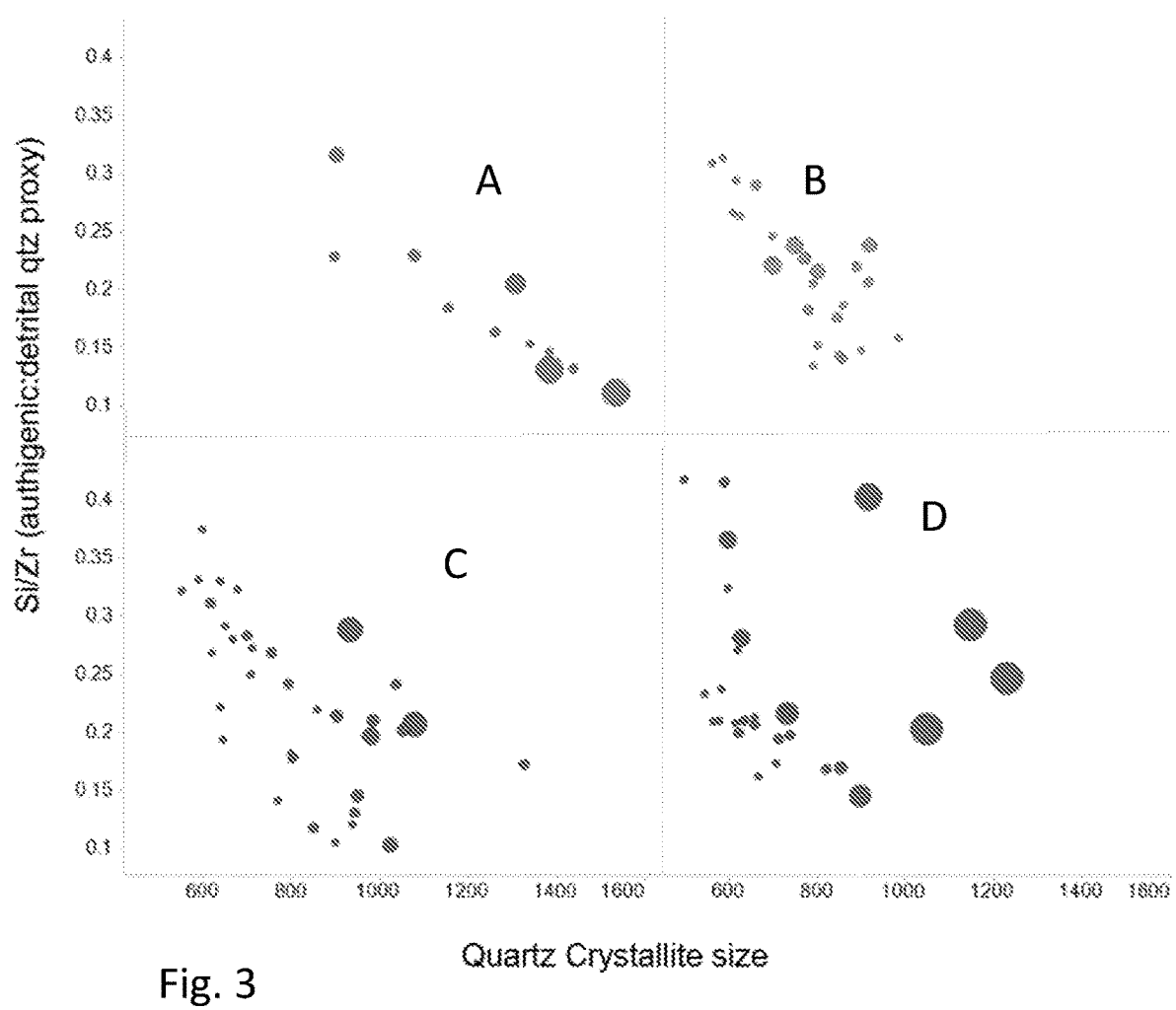
FIG. 3 is a plot of measured Si/Zr content ratio versus measured mean quartz crystallite size for a plurality of samples from four different sedimentary basins A, B, C and D.

In addition, the inventors have found that the Si/Zr ratio, and therefore the ratio of excess quartz to terrigenous quartz, in sedimentary rock samples correlates with measurements of $\tau$. For example, FIG. 3 shows how the Si/Zr content ratio varies as a function of mean quartz crystallite size (determined on the basis of XRD $\tau$ measurements) for a plurality of sedimentary rock samples extracted from four different sedimentary basins A, B, C and D. The size of the sample points is proportional to the total carbonate content of the rock samples. As can be seen, there is a negative linear relationship between the Si/Zr ratio and the quartz crystallite size. This relationship is even stronger when high-carbonate-containing samples are excluded (i.e. essentially limiting the results to siliciclastic rock samples).

Figure 14:
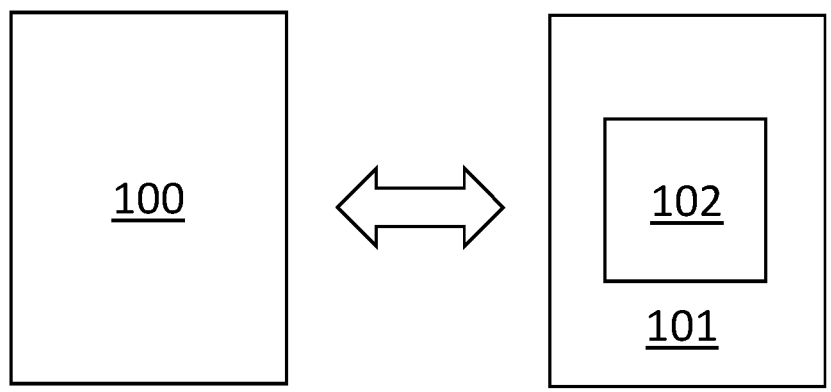
FIG. 14 shows a computer processor in communication with a computer-readable medium storing a computer program comprising computer-executable instructions.

Accordingly, measurements of the mean quartz crystallite size (i.e. $\tau$) can be used to identify the presence of terrigenous or excess (i.e. authigenic) quartz in sedimentary rock samples. Importantly, the amounts of terrigenous and excess (i.e. authigenic) quartz in a sample can also be quantified based on the measured mean quartz crystallite size (which provides a measure of the relative proportions of terrigenous and excess quartz in the sample) and a measurement of the total amount of quartz in the sample (which may be determined using quantitative XRD or spectroscopic techniques such as infra-red spectroscopy or X-ray fluorescence). For example, a measured mean quartz crystallite size can be compared to a trend line for the region in which the rock sample was obtained (e.g. as shown in FIG. 3) to determine the relative proportions of terrigenous quartz and excess quartz in the sample (i.e. the ratio of terrigenous quartz to excess quartz in the sample). The absolute quantities of terrigenous quartz and excess quartz in the sample can then be calculated based on these relative proportions (i.e. the ratio) and a measurement of the total amount of quartz in the sample. The skilled person will appreciate that this analysis is suited to automation and implementation in computer software (for example, computer software 102 stored on a computer-readable medium 101, for execution by a computer processor 100, as shown in FIG. 14).

Rock Mechanics

Rock mechanics is the study of the mechanical behaviour of rocks and rocks masses, i.e. the mechanical response of rocks to applied forces. Of particular concern in hydrocarbon exploration is the determination of the mechanical properties of subsurface rocks and, in particular, of subsurface sedimentary rock strata, which determine the rock's response to both natural environmental and artificially applied forces.

For example, geophysicists use the mechanical properties of subsurface rocks in the development and interpretation of seismic models. Knowledge of the mechanical properties of subsurface rocks is also required for accurate calculations of rock strength and of the pressure environments required to fracture rock (e.g., by hydraulic fracturing) or to maintain rock fractures (whether man-made or naturally occurring). Drilling engineers may also use knowledge of rock properties to avoid accidental fracture of rocks (for example, to reduce the risk of a blowout in an overpressured formation).

As discussed in more detail below, Young's modulus and Poisson's ratio are two important rock parameters used in the design, formation and maintenance of wells used in hydrocarbon exploration. An understanding of the fracture behaviour of subsurface sedimentary rocks is especially useful in unconventional hydrocarbon exploration (for example, for hydraulic fracturing of rocks in lateral wells). For example, Young's modulus can be used to calculate the fracture width which can be achieved using hydraulic fracturing processes, and the fracture width correlates with the hydrocarbon production achievable in a well.

The mechanical properties of rocks extracted from hydrocarbon wells can be measured precisely in the laboratory, for example using indentation-based mechanical testing techniques. However, the mechanical testing of core samples by standard laboratory methods can be time-consuming. Accordingly, alternative methods for determining the mechanical properties of rocks are being developed. Of particular importance are modelling methods which can be used to estimate the mechanical properties of a rock sample based on its composition.

Elastic Constant Modelling

As discussed hereinabove, rocks are composite materials. That is to say, rocks are not chemically or structurally homogeneous materials, but are instead aggregates of different mineral or mineraloid phases having different chemical compositions and structures. The mechanical properties of rocks, therefore, depend on the particular rock constituent phases and, in some cases, their relative arrangements.

For example, a shale rock typically comprises a plurality of layered clay (i.e. silicate) mineral sheets held together by a chemically and structurally distinct mineral matrix. The mineral matrix typically comprises a mixture of randomly oriented matrix mineral crystals, such as crystals of quartz, feldspar, calcite, dolomite, pyrite, etc. Shale rock may also include organic material, such as kerogen, bitumen and pyrobitumen.

The present inventors have found that rock mechanical properties can be predicted by considering the detailed composite nature of rock. For example, a rock mechanical property, $P_{Rock}$, for a given rock sample can be modelled as a linear function of the mass fraction, $W_X$, (e.g. in mass %) of each constituent component (i.e., phase) X in the rock, $$P_{Rock} = I + a_A W_A + a_B W_B + a_C W_C + \ldots,$$

where the constant (i.e. intercept) I and the coefficients $a_X$, associated with each component (i.e. phase) X, are determined by fitting the equation to experimental data, and the sum is taken over all components X=A, B, C ... in the rock. The value of the intercept and the coefficients can be determined based on a multiple linear regression analysis using, for example, a least squares method (as implemented in commercially-available software such as Microsoft Excel, available from Microsoft Corporation, WA, USA). Once a model has been fit by determining the values of the intercept and the coefficients, the equation can be used to predict the value of $P_{Rock}$ for an unknown rock sample based on measurements of the amount of each component (i.e. phase) in the rock. The skilled person will appreciate that such calculations are suited to automation and implementation in computer software (for example, computer software 102 stored on a computer-readable medium 101, for execution by a computer processor 100, as shown in FIG. 14).

Figure 4:
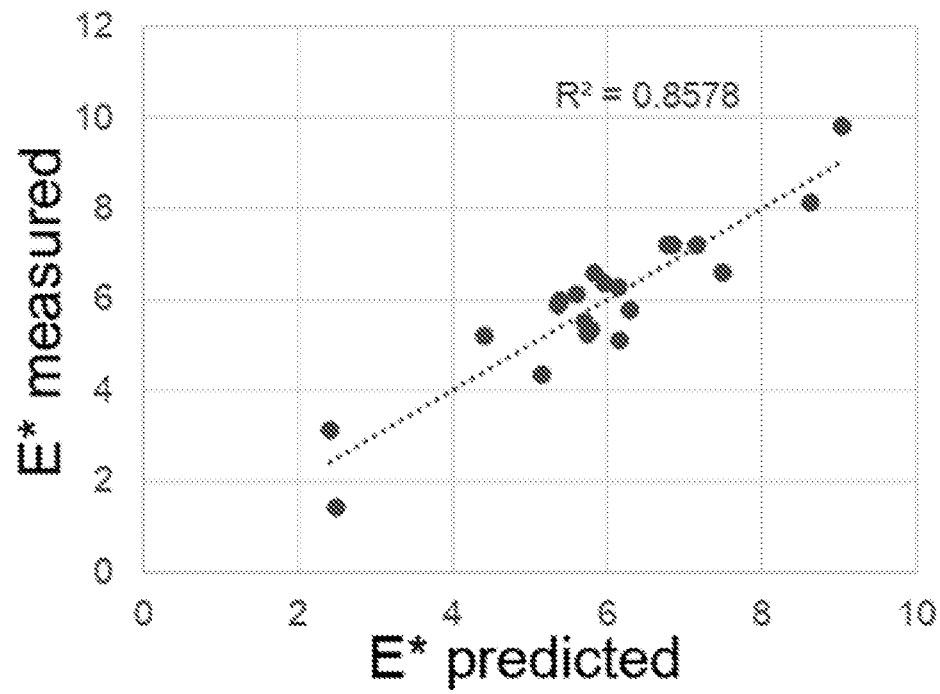
FIG. 4 is a plot of experimentally measured reduced Young's modulus versus predicted reduced Young's modulus (not taking into account mean quartz crystallite size) for a plurality of siliciclastic sedimentary rock samples taken from a first region.

The inventors have found that this method of calculating mechanical properties based on rock compositional measurements can produce results which agree well with experimentally-measured mechanical properties of rock samples. For example, FIG. 4 illustrates the correlation between (a) experimentally measured values of the reduced Young's modulus, E*, for a plurality of sedimentary rock samples taken from a particular geological formation and (b) corresponding values predicted using multiple linear regression based on a compositional analysis of the same samples. The reduced Young's modulus is defined according to $$E^* = \frac{E}{(1 - v^2)},$$

where E is Young's modulus and v is Poisson's ratio. E* is measured experimentally using impulse hammer analysis and has previously been found to correlate with scratch-test measurements of the unconfined compressive strength of rock samples (see, for example, GRAMIN, P, et al., *Evaluation of the Impulse Hammer Technique for Core Mechanical Properties Profiling*, presented at the International Symposium of the Society of Core Analysts, Snowmass, Colorado, USA, 21-26 Aug. 2016, which is hereby incorporated by reference in its entirety). For FIG. 4, the predicted values of E* were calculated according to $$E_{Sample}^* = I + a_{Quartz} W_{Quartz} + a_{Feldspar} W_{Feldspar} + a_{Carbonate} W_{Carbonate} + a_{Clay/OM} W_{Clay/OM}$$

using mass fractions of quartz, feldspar, carbonate, and clay minerals and organic material in combination (i.e. $W_{Quartz}$, $W_{Feldspar}$, $W_{Carbonate}$ and $W_{Clay/OM}$) measured by XRD and combustion analysis and corresponding coefficients determined by multiple linear regression. The values of the intercept and the coefficients used in FIG. 4 are presented in Table 1.

TABLE 1

| Parameter | Value |
| --- | --- |
| I | 13.624 |
| $a_{Quartz}$ | −0.032 |
| $a_{Feldspar}$ | 0.115 |
| $a_{Carbonate}$ | −0.116 |
| $a_{Clay/OM}$ | −0.197 |

As can be seen in FIG. 4, there is good agreement between the measured and predicted data (for example, a coefficient of determination, $R^2$, of about 0.858 is achieved).

The inventors have, however, found that the model can be improved by taking into account the mean quartz crystallite size, $\tau_{Quartz}$, when calculating $E^*$. For example, FIG. 5 shows the results obtained using the same experimental data as FIG. 4 when the predicted values of $E^*$ are instead calculated according to $$E_{Sample}^* = I + a_{Quartz}\tau_{Quartz}W_{Quartz} + a_{Feldspar}W_{Feldspar} + a_{Carbonate}W_{Carbonate} + a_{Clay/OM}W_{Clay/OM}$$

Figure 5:
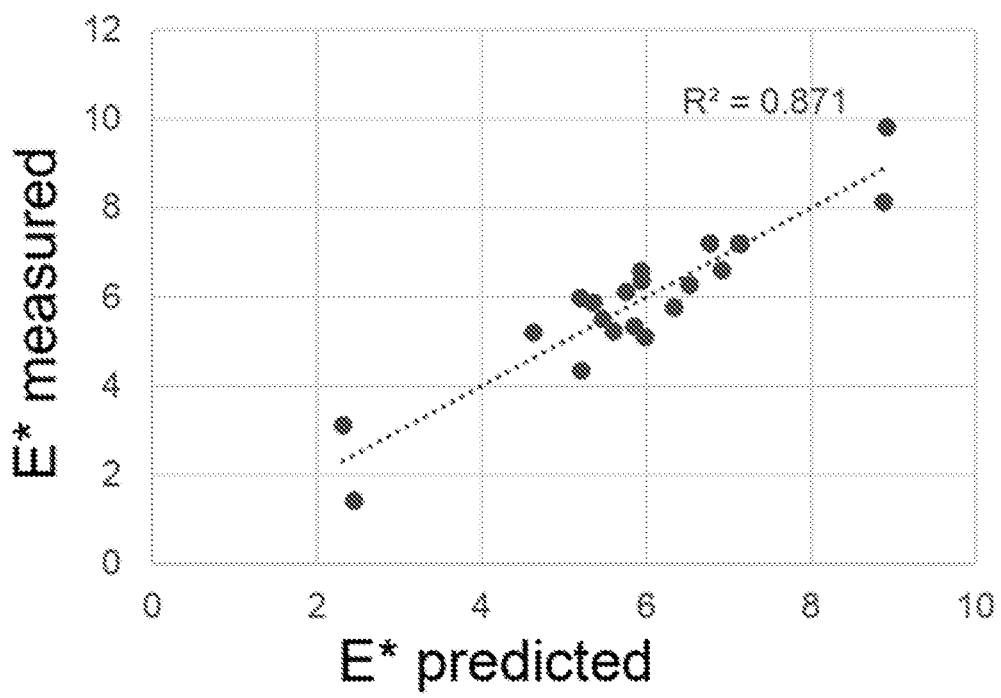
FIG. 5 is a plot of experimentally measured reduced Young's modulus versus predicted reduced Young's modulus (taking into account mean quartz crystallite size) for the plurality of siliciclastic sedimentary rock samples of FIG. 4.

To generate FIG. 5, the intercept and the coefficients of the model were refit to the experimental data and are presented in Table 2. As can be seen in FIG. 5, the inclusion of the mean quartz crystallite size in the calculation resulted in an improved $R^2$ value of 0.871.

TABLE 2

| Parameter | Value |
| --- | --- |
| I | 6.803 |
| $a_{Quartz}$ | 0.100 |
| $a_{Feldspar}$ | 0.051 |
| $a_{Carbonate}$ | −0.050 |
| $a_{Clay/OM}$ | −0.111 |

Figure 6:
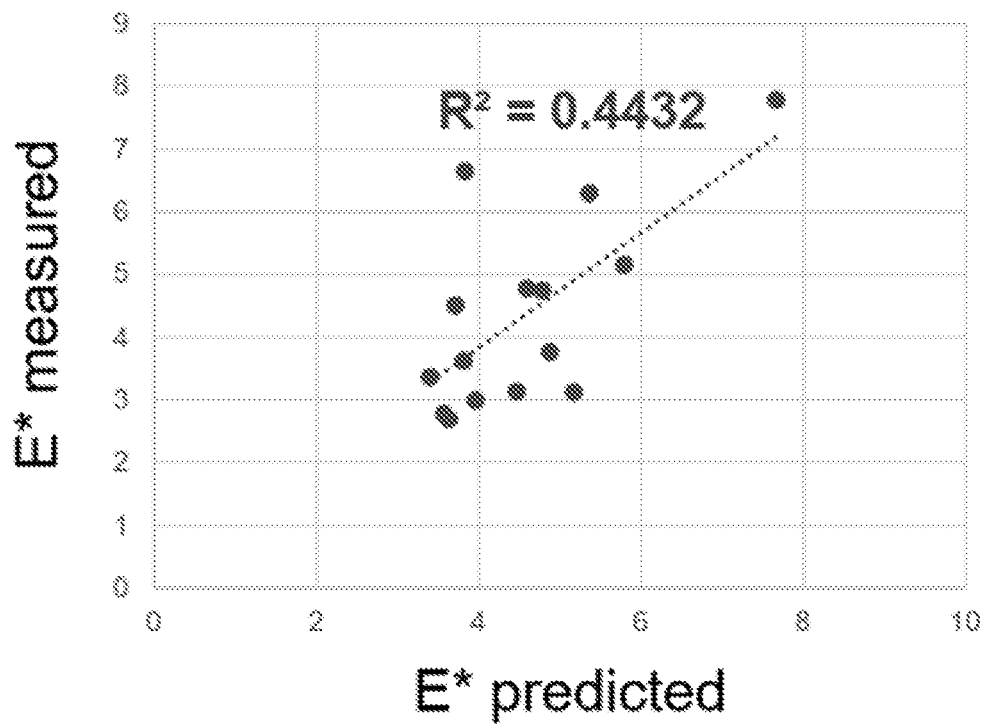
FIG. 6 is a plot of experimentally measured reduced Young's modulus versus predicted reduced Young's modulus (not taking into account mean quartz crystallite size) for a plurality of siliciclastic sedimentary rock samples taken from a second region.
Figure 7:
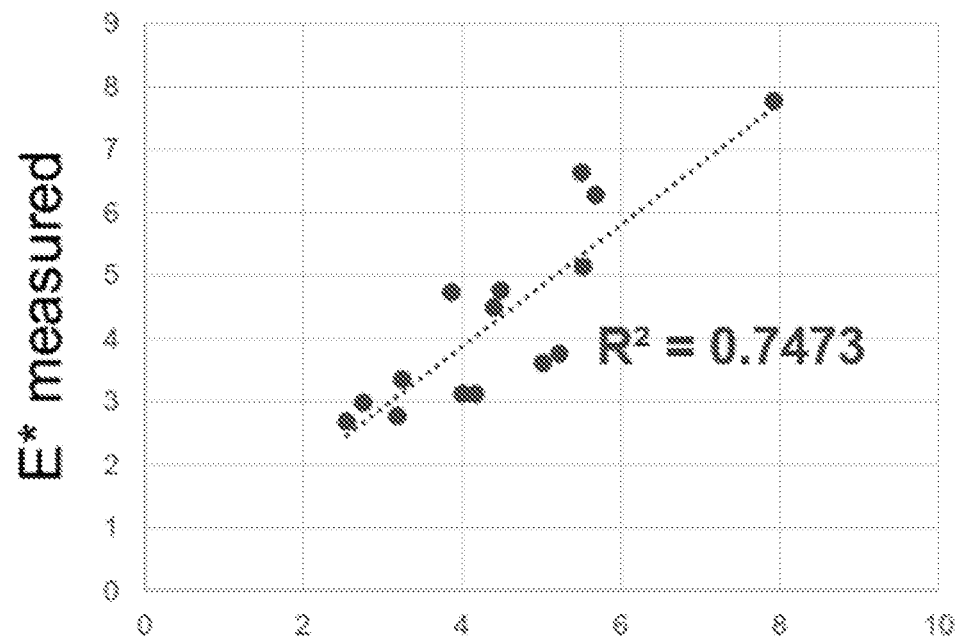
FIG. 7 is a plot of experimentally measured reduced Young's modulus versus predicted reduced Young's modulus (taking into account mean quartz crystallite size) for the plurality of siliciclastic sedimentary rock samples of FIG. 6.

FIGS. 6 and 7 show the results of taking into account the mean quartz crystallite size when predicting $E^*$ in the same way for sedimentary rock samples taken from a second formation. In particular, FIG. 6 compares measured $E^*$ values with those predicted not taking quartz crystallite size into account, while FIG. 7 shows the corresponding results when the calculation of $E^*$ does take the mean quartz crystallite size into account. In this case, the predictive model takes into account the presence of quartz, feldspar, calcite, dolomite, ankerite, clay minerals and organic matter phases. As can be seen, the $R^2$ value is improved from 0.443 to 0.747 by including the quartz crystallite size in the calculation.

As explained hereinabove, mean crystallite size is only measurable from a powder XRD pattern when the crystallite size is less than about 10000 Å. Accordingly, although without wishing to be bound by theory, the inventors posit that the inclusion of the quartz crystallite size may result in greater improvements in the predictive power of the model when fit to data obtained from rock samples including smaller quartz crystallites, and that the improvement in the predictive power is lower when the model is fit to data obtained from rock samples including larger quartz crystallites, for example more quartz crystallites greater than 10000 Å in size. This may account for the relatively larger improvement in $R^2$ between the models in FIGS. 6 and 7 as compared to the relatively smaller improvement in $R^2$ between the models in FIGS. 4 and 5.

Figure 8:
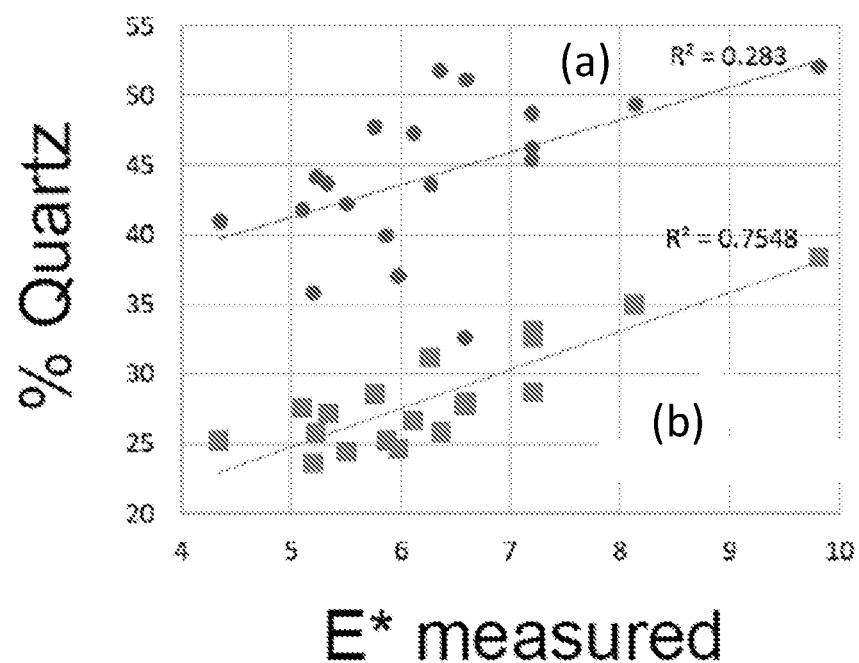
FIG. 8 is a plot of amount of quartz versus experimentally measured reduced Young's modulus for the plurality of siliciclastic sedimentary rock samples taken from the first region used in the construction of FIGS. 4 and 5.

In addition, although taking into account the mean quartz crystallite size may in some cases only result in modest improvements in the $R^2$ value in terms of prediction of mechanical properties such as $E^*$, the mean quartz crystallite size can also be used to evaluate the impact of the quartz depositional form on mechanical properties. For example, FIG. 8 is a plot of the "amount" of quartz versus measured $E^*$ for the samples taken from the first geological formation used in the construction of FIGS. 4 and 5. FIG. 8 shows two sets of data (a) and (b). In data set (a), the "amount" of quartz plotted is the measured mass % of quartz in each sample. In data set (b), the "amount" of quartz plotted is the measured mass % of quartz in each sample multiplied by the normalized mean quartz crystallite size. As can be seen in FIG. 8, there is a significantly stronger correlation (in terms of an increased $R^2$ value) between the amount of quartz present in the samples and the measured $E^*$ values when the mean quartz crystallite size is taken into account. As the mean quartz crystallite size is related to the depositional form of the quartz, this indicates that the depositional form impacts the mechanical properties of the rock.

Figure 9:
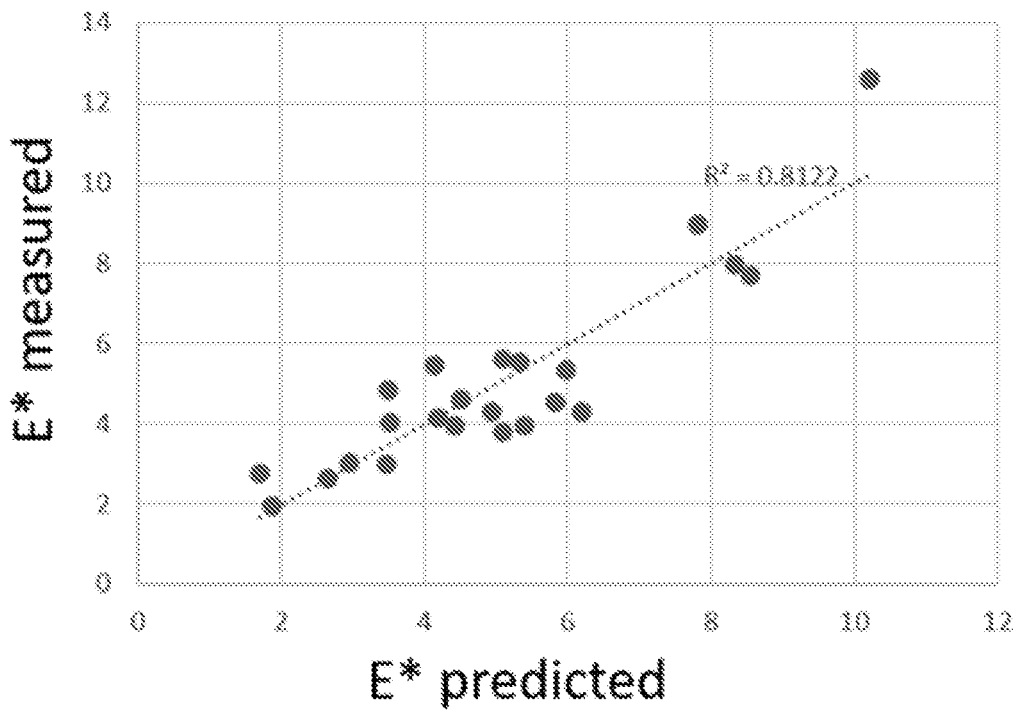
FIG. 9 is a plot of experimentally measured reduced Young's modulus versus predicted reduced Young's modulus (not taking into account mean quartz crystallite size) for a plurality of siliciclastic sedimentary rock samples taken from a third region.
Figure 10:
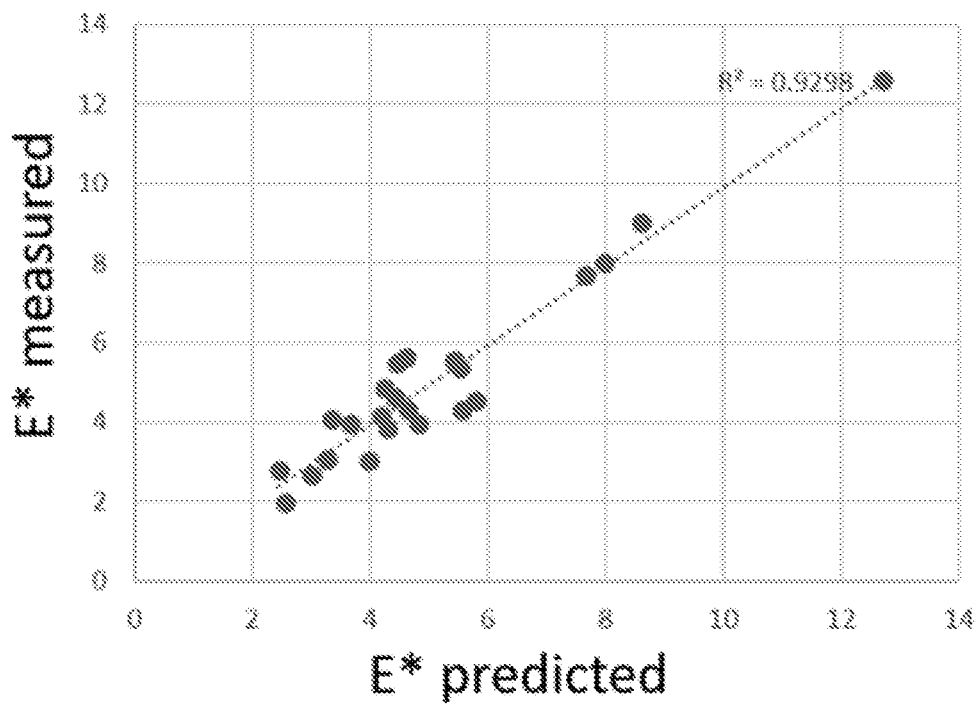
FIG. 10 is a plot of experimentally measured reduced Young's modulus versus predicted reduced Young's modulus (taking into account mean quartz crystallite size) for the plurality of siliciclastic sedimentary rock samples of FIG. 8.

FIGS. 9 and 10 show the results of taking into account the mean quartz crystallite size when predicting $E^*$ for sedimentary rock samples taken from a third formation. In particular, FIG. 9 compares measured $E^*$ values with those predicted not taking quartz crystallite size into account, while FIG. 10 shows the corresponding results when the calculation of $E^*$ does take the mean quartz crystallite size into account. The predictive model takes into account the presence of quartz, feldspar, carbonate, clay minerals and organic matter phases. As can be seen, the $R^2$ value is improved from 0.812 to 0.930 by including the quartz crystallite size in the calculation.

Figure 11:
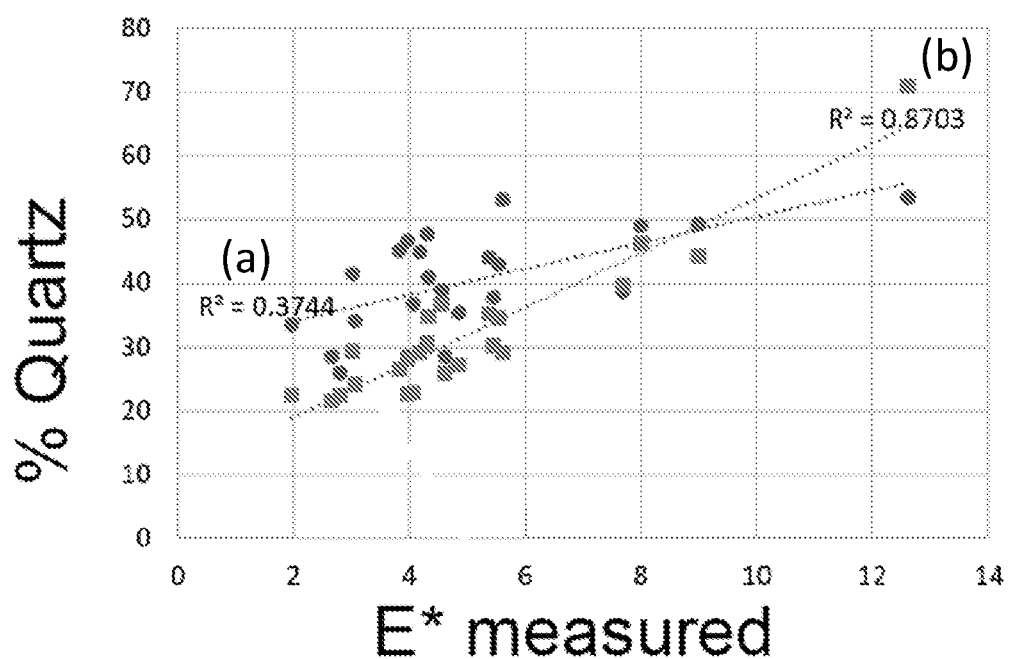
FIG. 11 is a plot of amount of quartz versus experimentally measured reduced Young's modulus for the plurality of siliciclastic sedimentary rock samples taken from the third region used in the construction of FIGS. 9 and 10.

For example, FIG. 11 is a plot of the "amount" of quartz versus measured $E^*$ for the samples taken from the third formation used in the construction of FIGS. 9 and 10. FIG. 11 shows two sets of data (a) and (b). In data set (a), the "amount" of quartz plotted is the measured mass % of quartz in each sample. In data set (b), the "amount" of quartz plotted is the measured mass % of quartz in each sample multiplied by the normalized mean quartz crystallite size. As can be seen in FIG. 11, there is a significantly stronger correlation (in terms of an increased $R^2$ value) between the amount of quartz present in the samples and the measured $E^*$ values when the mean quartz crystallite size is taken into account. As the mean quartz crystallite size is related to the depositional form of the quartz, this indicates that the depositional form impacts the mechanical properties of the rock.

Figure 12:
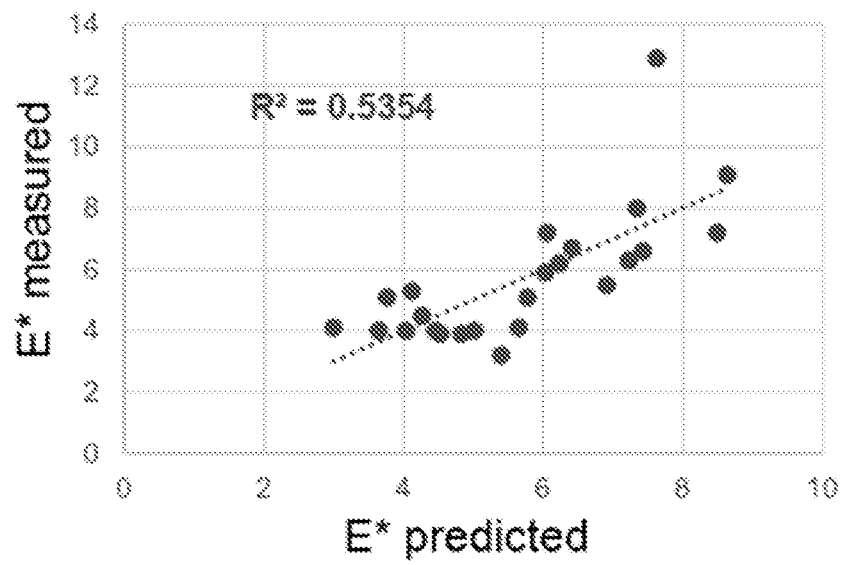
FIG. 12 is a plot of experimentally measured reduced Young's modulus versus predicted reduced Young's modulus (not taking into account mean quartz crystallite size) for a plurality of siliciclastic sedimentary rock samples taken from a fourth region.
Figure 13:
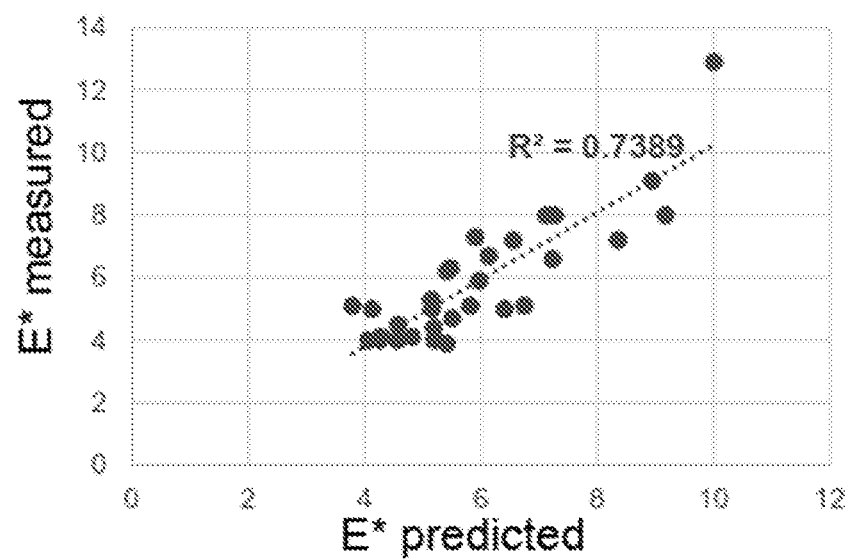
FIG. 13 is a plot of experimentally measured reduced Young's modulus versus predicted reduced Young's modulus (taking into account mean quartz crystallite size) for the plurality of siliciclastic sedimentary rock samples of FIG. 10.

FIGS. 12 and 13 show the results of taking into account the mean quartz crystallite size when predicting $E^*$ for sedimentary rock samples taken from a fourth formation. In particular, FIG. 12 compares measured $E^*$ values with those predicted not taking quartz crystallite size into account, while FIG. 13 shows the corresponding results when the calculation of $E^*$ does take the mean quartz crystallite size into account. The predictive model takes into account the presence of quartz, feldspar, carbonate and clay minerals. As can be seen, the $R^2$ is improved from 0.535 to 0.7389 by including the quartz crystallite size in the calculation.

Although the preceding results relate to quartz in particular, it will appreciated that similar methods could be used to take into account the mean crystallite size of other crystalline phases (e.g. calcite) present in rock samples. In order to account for the mean crystallite size of multiple crystalline phases in the rock, the mechanical property, $P_{Rock}$, of the rock sample may be modelled as a linear function of (a) the mass fraction, $W_X$, (e.g. in mass %) of each phase, $X=A, B, C\ldots$, in the rock and (b) the mean size of crystallites, $\tau_X$, of each phase in the rock as $$P_{Rock} = I + a_A\tau_AW_A + a_B\tau_BW_B + a_C\tau_CW_C + \ldots .$$

Where a mean crystallite size of a given phase is not to be taken into account, the corresponding value of $\tau_X$ could be set to unity.

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method comprising identifying a depositional form of a mineral phase in a sedimentary rock sample based on a measurement of a parameter indicative of a size of crystallites of the mineral phase in the rock sample, wherein the measurement of the parameter indicative of the size of crystallites of the mineral phase in the sedimentary rock sample is obtained by powder X-ray diffraction.

2. The method according to claim 1, wherein the parameter indicative of the size of crystallites of the mineral phase in the sedimentary rock sample is a parameter indicative of a mean size of crystallites of the mineral phase in the sedimentary rock sample.

3. The method according to claim 1, wherein identifying the depositional form of the mineral phase in the sedimentary rock sample comprises:
   measuring a peak width of a peak associated with the mineral phase in an X-ray diffraction pattern obtained from the sedimentary rock sample;
   determining a value of the parameter indicative of the size of crystallites of the mineral phase in the sedimentary rock sample based on the measured peak width; and
   identifying the depositional form of the mineral phase in the sedimentary rock sample based on the determined value of the parameter indicative of the size of crystallites of the mineral phase in the sedimentary rock sample.

4. The method according to claim 1 comprising determining an amount of the mineral phase in the sedimentary rock sample having the identified depositional form based on the measurement of the parameter indicative of the size of crystallites of the mineral phase in the sedimentary rock sample.

5. The method according to claim 4 comprising determining respective amounts of the mineral phase in the sedimentary rock sample having first and second depositional forms based on the measurement of the parameter indicative of the size of crystallites of the mineral phase in the sedimentary rock sample.

6. The method according to claim 1, wherein the mineral phase is quartz.

7. The method according to claim 1, wherein the sedimentary rock sample is a cuttings sample.

8. The method according to claim 1, wherein the steps of claim 1 are carried out by a computer.

* * * * *